(12) United States Patent
Zhang et al.

(10) Patent No.: US 10,928,207 B2
(45) Date of Patent: Feb. 23, 2021

(54) CAMERA BASED LOCALIZATION FOR AUTONOMOUS VEHICLES

(71) Applicant: DeepMap Inc., Palo Alto, CA (US)

(72) Inventors: Ronghua Zhang, Campbell, CA (US); Lin Yang, San Carlos, CA (US)

(73) Assignee: DEEPMAP INC., Palo Alto, CA (US)

( * ) Notice: Subject to any disclaimer, the term of this patent is extended or adjusted under 35 U.S.C. 154(b) by 143 days.

(21) Appl. No.: 16/290,658

(22) Filed: Mar. 1, 2019

(65) Prior Publication Data

US 2019/0271549 A1 Sep. 5, 2019

Related U.S. Application Data

(60) Provisional application No. 62/637,997, filed on Mar. 2, 2018.

(51) Int. Cl.
| | |
|---|---|
| *G01C 21/32* | (2006.01) |
| *G05D 1/02* | (2020.01) |
| *G05D 1/00* | (2006.01) |
| *G06F 16/29* | (2019.01) |
| *G06T 7/70* | (2017.01) |

(52) U.S. Cl.
CPC .......... *G01C 21/32* (2013.01); *G05D 1/0088* (2013.01); *G05D 1/0246* (2013.01); *G06F 16/29* (2019.01); *G06T 7/70* (2017.01); *G05D 2201/0213* (2013.01); *G06T 2207/30244* (2013.01); *G06T 2207/30252* (2013.01)

(58) Field of Classification Search
CPC . G01C 21/32; G06T 7/70; G06T 2207/30244; G06T 2207/30252; G06F 16/29; G05D 1/0088; G05D 1/0246; G05D 2201/0213
See application file for complete search history.

(56) References Cited

U.S. PATENT DOCUMENTS

| | | | |
|---|---|---|---|
| 10,580,158 B1* | 3/2020 | Mousavian | ........ G06K 9/00201 |
| 2017/0010106 A1 | 1/2017 | Shashua et al. | |
| 2018/0313940 A1* | 11/2018 | Wu | ...................... G05D 1/0246 |
| 2019/0042860 A1* | 2/2019 | Lee | ..................... G06K 9/00798 |
| 2019/0050000 A1* | 2/2019 | Kennedy | ................ G05D 1/102 |

(Continued)

OTHER PUBLICATIONS

PCT International Search Report and Written Opinion, PCT Application No. PCT/US2019/020438, dated Apr. 30, 2019, 15 pages.

(Continued)

*Primary Examiner* — Hussein Elchanti
(74) *Attorney, Agent, or Firm* — Maschoff Brennan

(57) ABSTRACT

Camera based localization performed to determine a current pose of an autonomous vehicle without the aid of depth sensors such as LiDAR. The vehicle comprises an imaging system configured to capture image frames depicting portions of the surrounding area. Based on an initial pose of the vehicle, edgels corresponding to three-dimensional locations are loaded and mapped to corresponding edge pixels of the captured image frame. A pose of the vehicle is optimized based upon the determined correspondences by identifying a transformation that minimizes a distance between the edgels and their corresponding edge pixels. The determined transformation can be applied to the initial pose to determine an updated pose of the vehicle.

24 Claims, 22 Drawing Sheets

(56) References Cited

U.S. PATENT DOCUMENTS

2019/0065864 A1* 2/2019 Yu ..................... G06K 9/00805
2019/0197325 A1* 6/2019 Reiley .................. G08B 21/24
2019/0213426 A1* 7/2019 Chen .................. G06K 9/00798

OTHER PUBLICATIONS

Piccini, T et al., "Good Edgels to Track: Beating the Aperture Problem with Epipolar Geometry," European Conference on Computer Vision 2014: Computer Vision—ECCV 2014 Workshops, Mar. 20, 2015, pp. 652-664.

* cited by examiner

CAMERA BASED LOCALIZATION FOR AUTONOMOUS VEHICLES

CROSS-REFERENCE TO RELATED APPLICATION

This application claims the benefit of U.S. Provisional Application No. 62/637,997, filed Mar. 2, 2018, which is hereby incorporated by reference in its entirety.

BACKGROUND

This disclosure relates generally to localization of autonomous vehicles, and more particularly to performing localization of autonomous vehicles based on camera images and high definition maps having high precision.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

One task that is frequently performed by an autonomous vehicle as the autonomous vehicle drives along a route is localization. The autonomous vehicle performs localization to determine the current location of the autonomous vehicle. This allows the autonomous vehicle to determine the next action to perform. For example, the autonomous vehicle may determine based on its current location that certain traffic signs are coming up and take appropriate actions. Similarly, the autonomous vehicle may determine based on its current location that the vehicle needs to make a turn at an intersection to continue along the route. Determination of accurate location of the autonomous vehicle is critical for navigating the autonomous vehicle safely along the. Techniques that determine a location of a vehicle based on GPS (global positioning system) signals are unable to determine the location of the autonomous vehicle accurately.

SUMMARY

HD maps may be used to aid in the guidance of autonomous vehicles. However, in order be able to navigate using an HD map, it may be important to be able to determine the position of the vehicle as it travels through the local area corresponding to the map. The process of determining the position of the vehicle may be referred to as localization. In order to perform localization, a vehicle may have one or more sensor systems, such as an imaging system configured to capture images of the local area, and/or a depth sensing system such as LiDAR configured to obtain depth information of features in the local area.

In some embodiments, camera based localization performed to determine a current pose of an autonomous vehicle without the aid of depth sensors such as LiDAR. The vehicle comprises an imaging system configured to capture image frames depicting portions of the surrounding area. Based on an initial pose of the vehicle, edgels corresponding to three-dimensional locations are loaded and mapped to corresponding edge pixels of the captured image frame. A pose of the vehicle is optimized based upon the determined correspondences by identifying a transformation that minimizes a distance between the edgels and their corresponding edge pixels. The determined transformation can be applied to the initial pose to determine an updated pose of the vehicle.

In some embodiments, systems, methods, and computer program products for performing camera-based localization are provided. For example, a method may comprise receiving, by an autonomous vehicle, from an imaging system mounted on the vehicle, an image frame, the image frame depicting a portion of the local area surrounding the vehicle, and receiving an initial pose of the autonomous vehicle. The method further comprises loading a plurality of edgels based upon a location of the initial pose, each edgel corresponding to a three-dimensional location and a gradient direction, and analyzing the image frame to identify a plurality of edge pixels within the image frame, wherein each edge pixel is associated with a gradient direction. For example, for each edgel of a subset of the plurality of edgels, the method may comprise projecting the edgel onto the image frame, based upon an initial pose, and determining a correspondence between the projected edgel and an edge pixel of the plurality of edge pixels, based upon a distance between the projected edgel and the edge pixel. The method further comprises optimizing a pose of the autonomous vehicle based upon the determined correspondences by determining a transformation that if applied to the subset of edgels minimizes an aggregate distance between the subset of edgels and their corresponding edge pixels, and applying the determined transformation to the initial pose to determine a current pose of the autonomous vehicle. Control signals can then be provided controls of the vehicle to navigate the autonomous vehicle based on the current pose of the autonomous vehicle.

In some embodiments, determining the correspondence between the projected edgel and the edge pixel of the plurality of edge pixels is further based on a level of similarity between the gradient direction of the projected edgel and the gradient direction of the corresponding edge pixel.

In some embodiments, the plurality of edgels are associated with a map, where receiving the edgels comprises receiving the map indicating edgels within a local area. In some embodiments, the plurality of edgels correspond to edgels indicated in the map having three-dimensional locations within a threshold radius of the location of the initial pose.

In some embodiments, the plurality of edgels are organized into a plurality of clusters, each cluster corresponding to two or more edgels within a threshold distance of each other, based upon the respective three-dimensional locations of the two or more edgels. In some embodiments, the subset of edgels by downsampling the edgels of each of the plurality of clusters. Downsampling the edgels of a cluster may comprise dividing the edgels of the first cluster into a plurality of buckets, based upon gradient direction of the edgels, and, for each bucket of the plurality of buckets, retaining a first edgel of the bucket having a location closest to the location of the initial pose and a second edgel of the bucket having a location farthest from the location of the initial pose, and sampling the remaining edgels of the bucket based upon distance to the location of the initial pose. In addition, structural information may be determined for a cluster indicating at least a distance between a first edgel and a second edgel of the cluster. Based upon a determination that the first edgel and second edgel correspond to different edges within the image frame, a type of feature associated with the cluster may be inferred based upon the distance between the first and second edgels.

In some embodiments, optimizing the pose of the vehicle further comprises iteratively applying the determined transformation to the subset of edges, determining a level of convergence based upon the aggregate distance between the transformed subset of edgels and their corresponding edge pixels, and, in response to the level of convergence not satisfying a threshold value: updating the correspondences by determining a corresponding edge pixel for each of the transformed subset of edgels, and determining an updated transformation to minimize the aggregate distance between the subset of edgels and their corresponding edge pixels, based upon the updated correspondences.

In some embodiments, analyzing the image frame to identify a plurality of edge pixels within the image frame comprises identifying a portion of the image frame corresponding to ground, and identifying the plurality of edge pixels within the identified portion.

In some embodiments, the initial pose and the map are used to determine a ground normal vector, such that when determining the transformation to optimize the pose of the vehicle, one or more components of the determined transformation can be restricted based upon the determined ground normal vector.

In some embodiments, the map is generated by detecting one or more edges in a first image, each edge having one or more pixels each having a corresponding gradient, receiving a point corresponding to a three-dimensional location, and identifying a corresponding pixel of the first image by projecting the point onto the first image. In response to a determination that the corresponding pixel is a pixel on an edge of the one or more edges, the point can be designated as an edgel. In addition, a gradient direction corresponding to the edgel may be determined based upon the gradient of the first point. Information describing the edgel is stored into the map.

Figure 1:
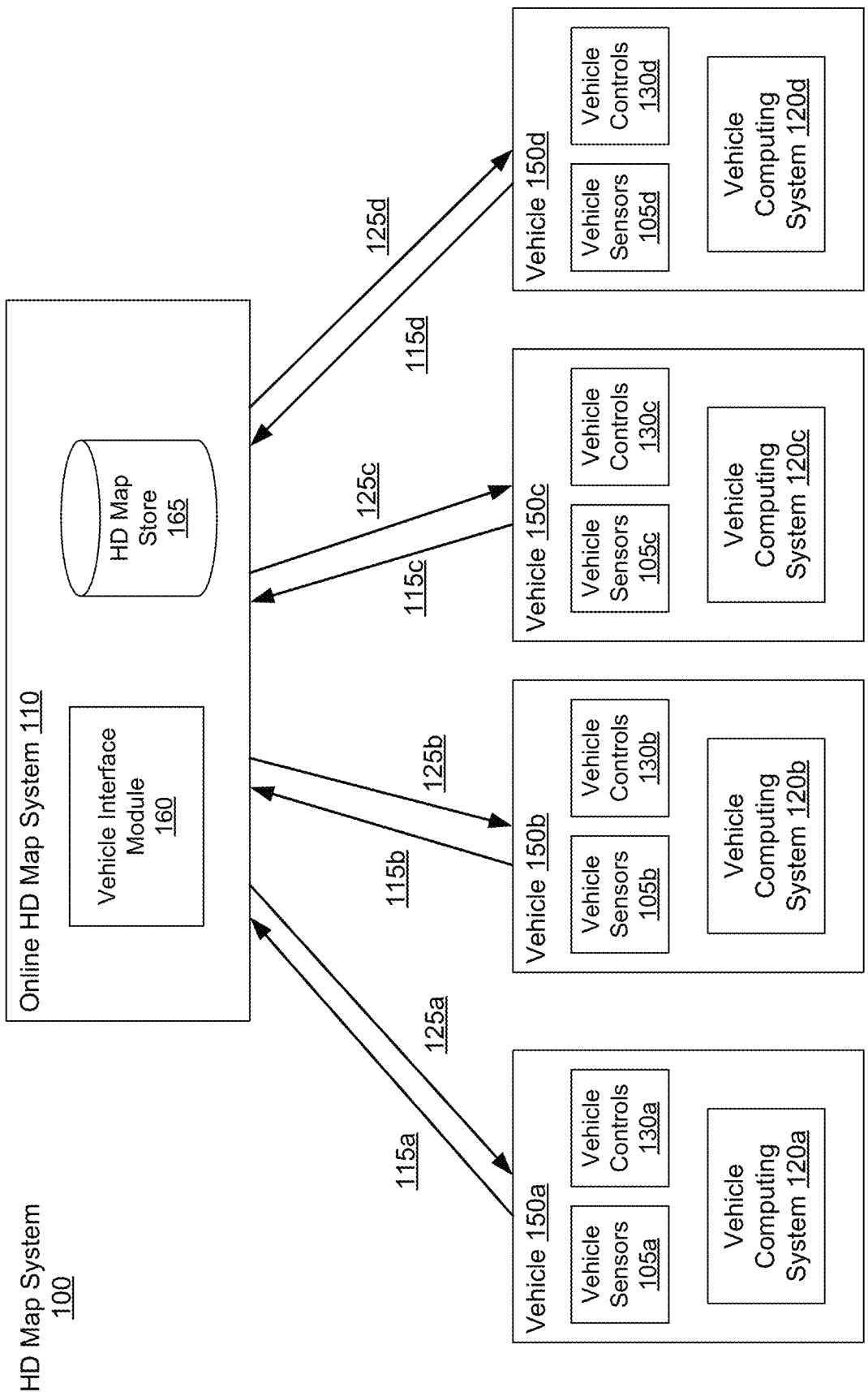
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
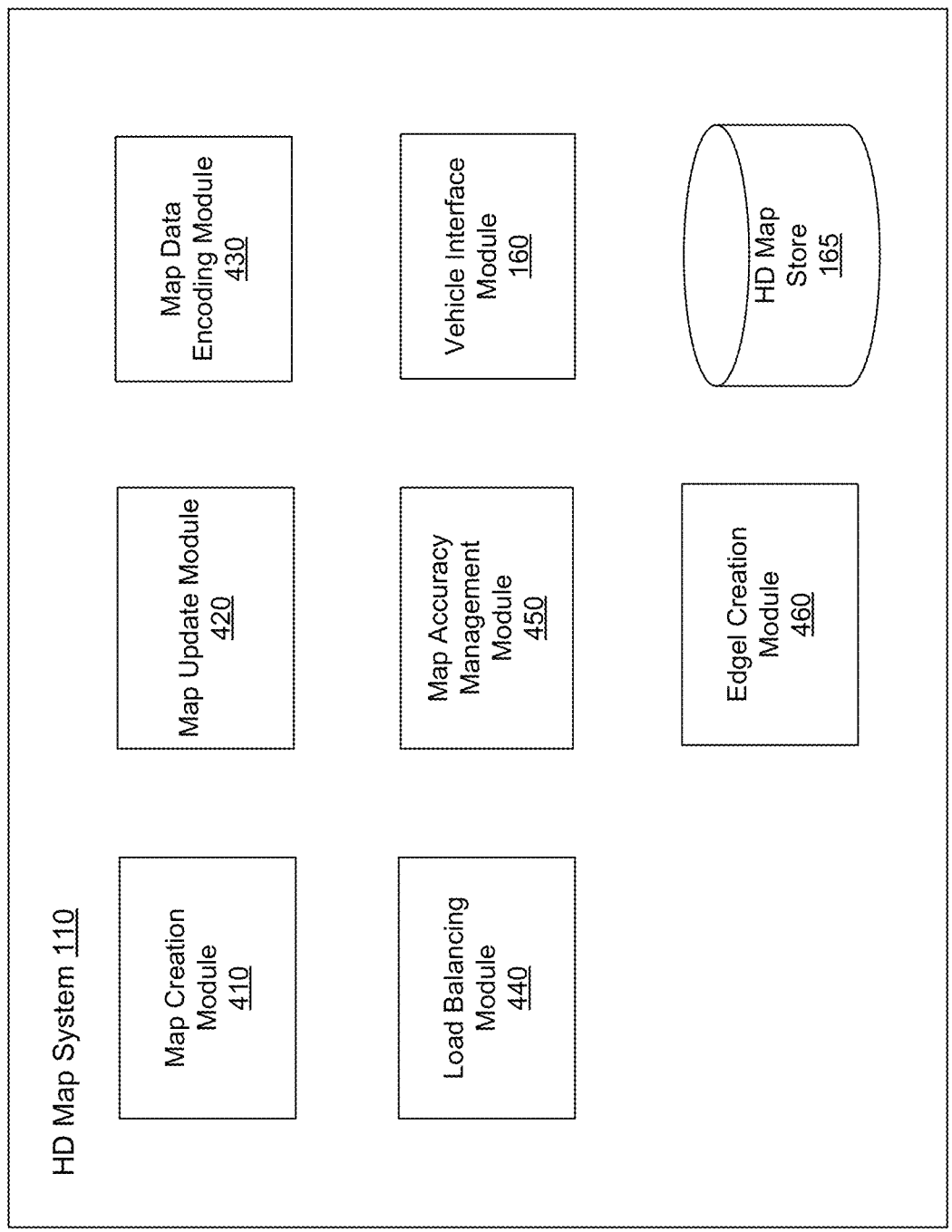
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
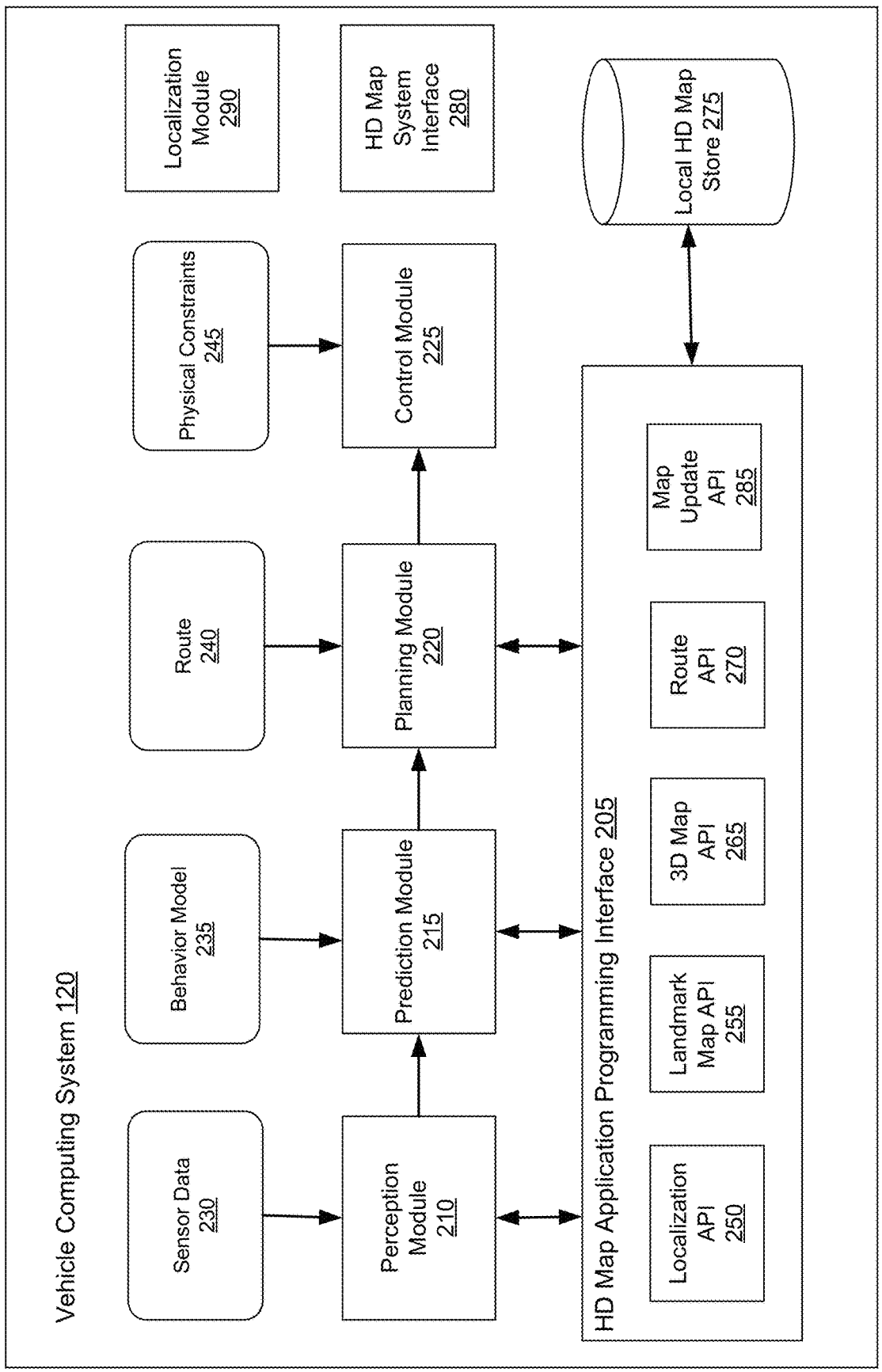
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary. In some embodiments, the fetch-navigable-surfaces API and/or the fetch-occupancy grid API may be implemented as part of the landmark map API 255.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
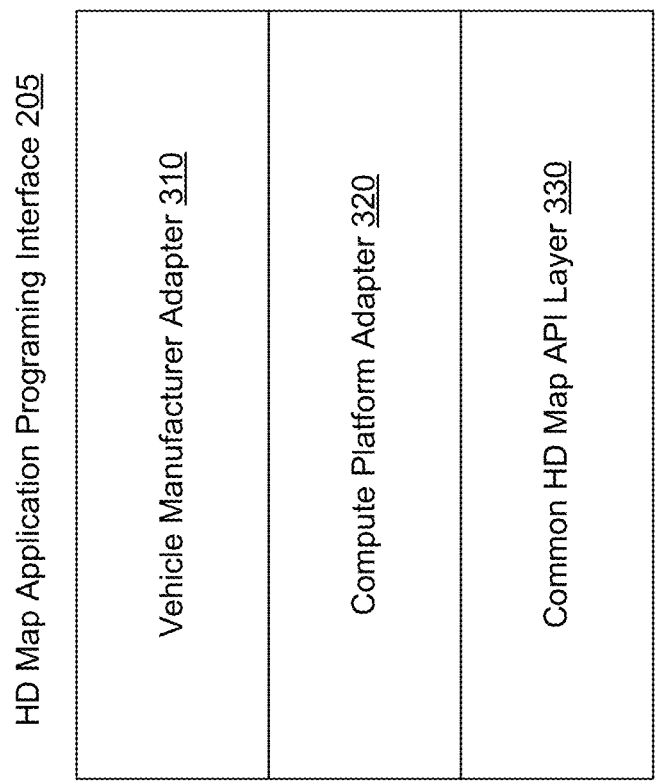
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy. The edgel creation module 460 analyzes images and sensor readings (e.g., depth information from LiDAR scans) to create and store information describing edgels in the HD map store 165. The edgel information can be used by a localization module of a vehicle to perform localization using camera based images.

Figure 5:
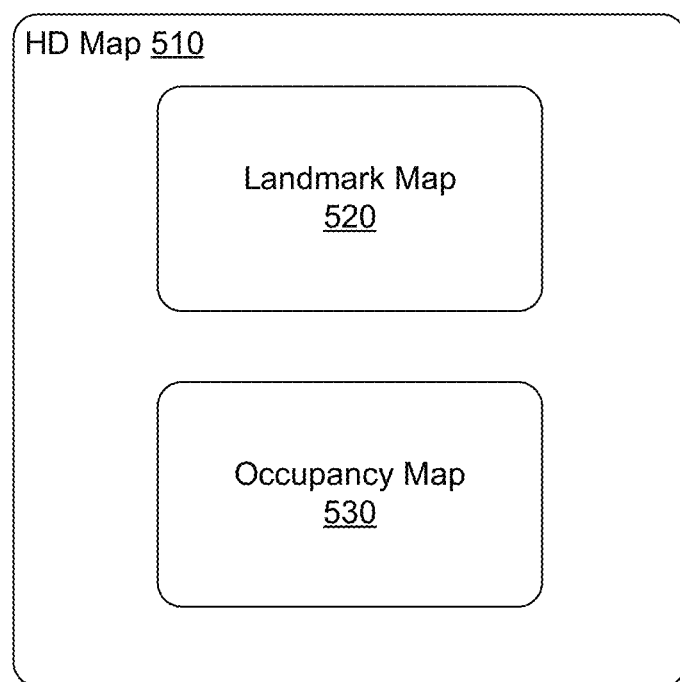
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on. In some embodiments, one or more of the LMAP 520 or the OMap 530 may be verified by a human operator.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
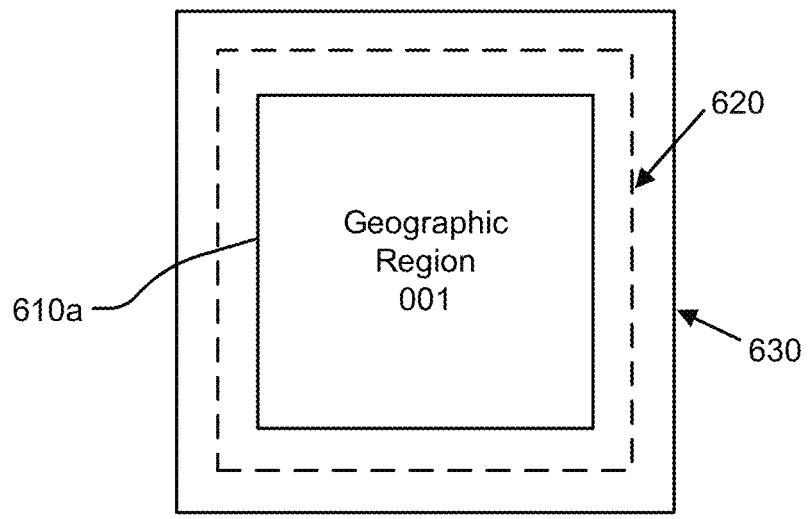
FIGS. 6A-B illustrate geographical regions defined in an HD map, according to an embodiment.
Figure 6B:
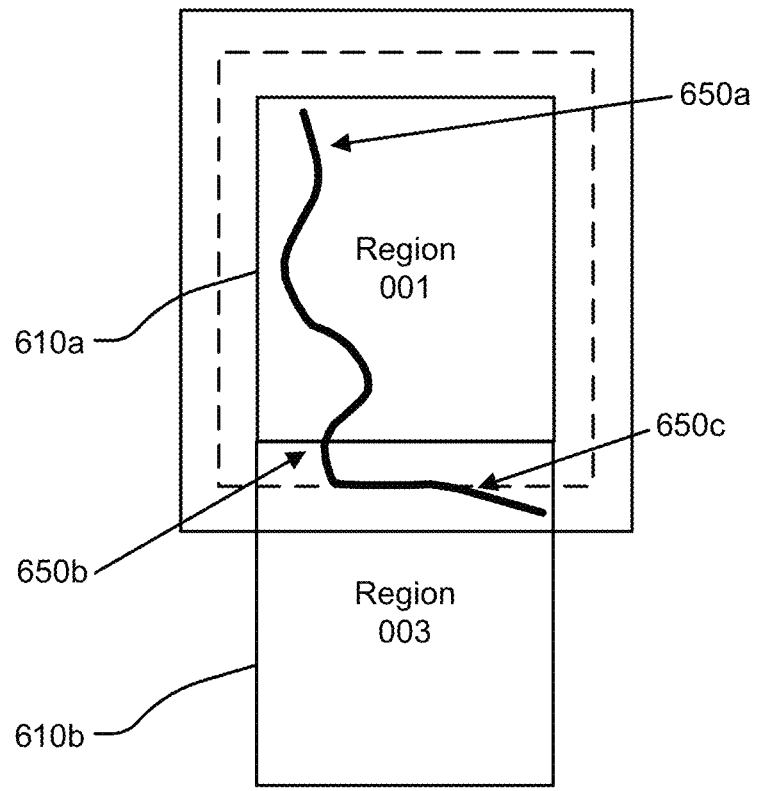

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
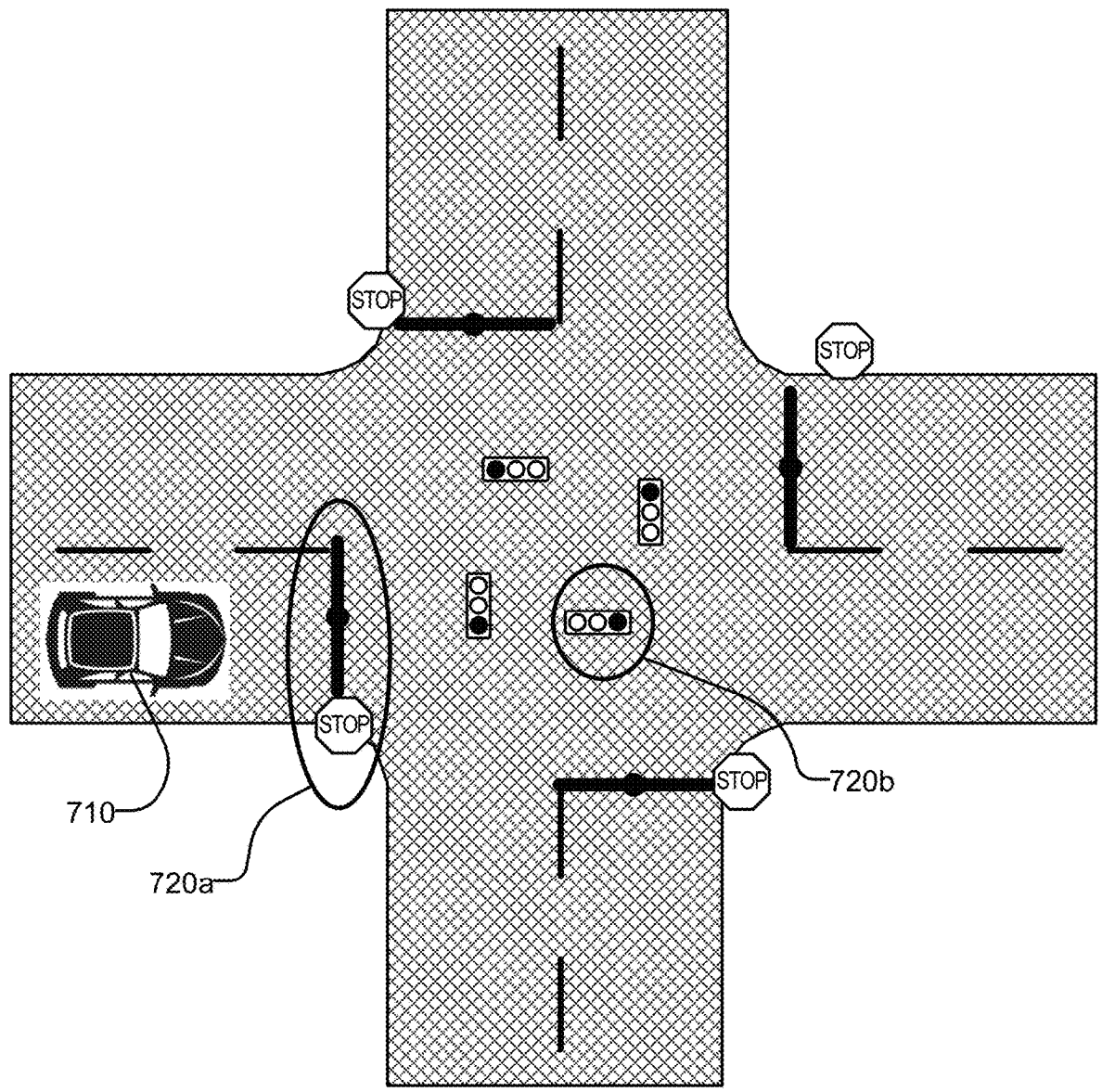
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
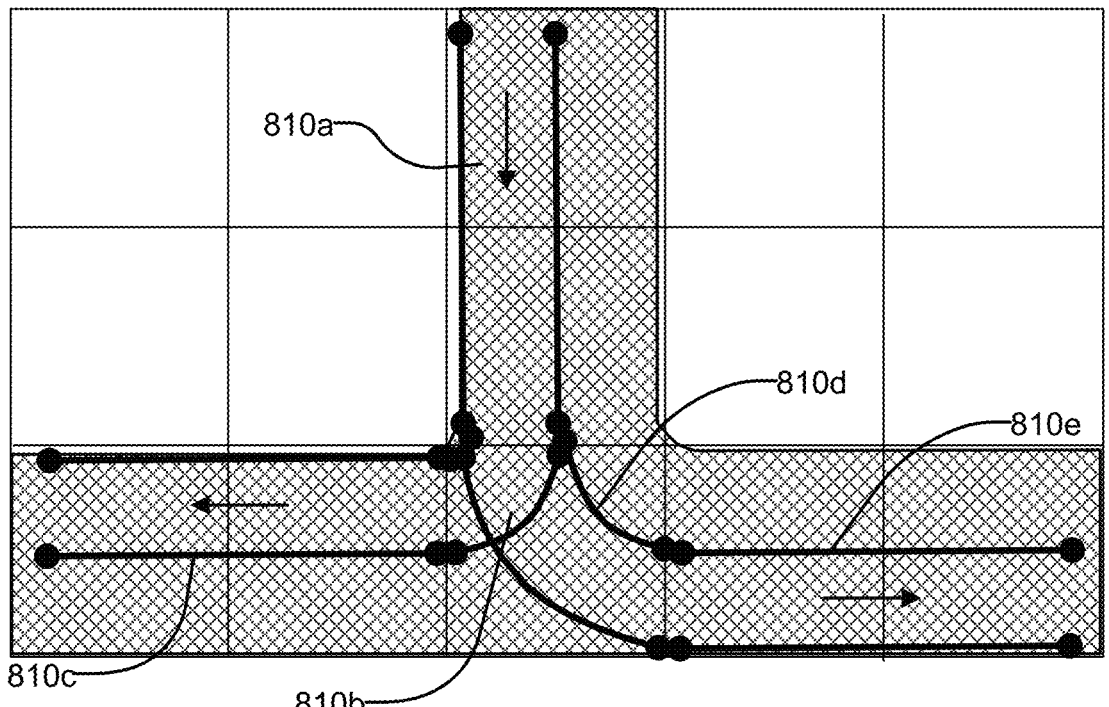
FIGS. 8A-B illustrates lane elements and relations between lane elements in an HD map, according to an embodiment.
Figure 8B:
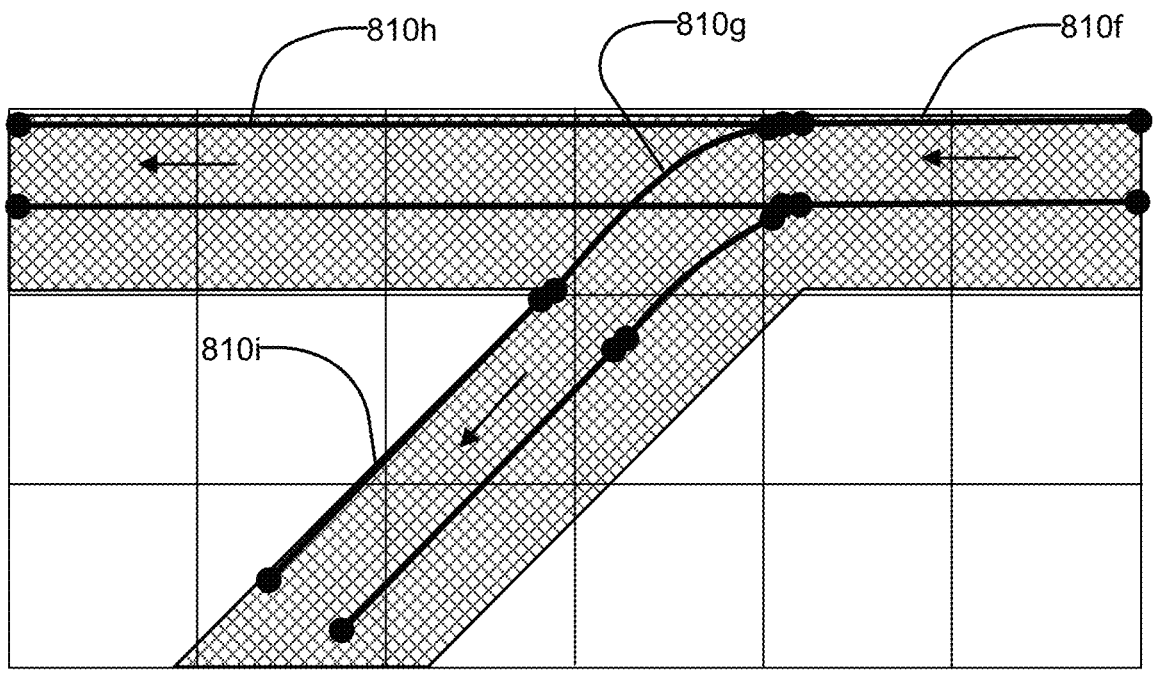

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Camera-Based Localization

In some embodiments, techniques using LiDAR or other sensors capable of depth sensing can be used to perform localization to determine a current pose of a vehicle. For example, in iterative closest point (ICP) techniques, LiDAR or other types of depth sensors can be used to capture a three-dimensional point cloud of a local area surrounding the vehicle, which can be matched with previously-acquired map data comprising points or features corresponding to different locations of the local area. By determining a transformation that best aligns the sensed point cloud with the map data, a location and orientation of the vehicle can be determined. For ease of explanation, any type of sensor usable for determining depth information of a local area may hereinafter be referred to collectively as LiDAR, although it is understood that in some embodiments techniques other than LiDAR may be used.

However, while ICP-based localization methods can provide robust and accurate means for performing localization in many different scenarios, other localization methods may be used to supplement or replace ICP-based localization (e.g., as a backup option in case of LiDAR failure). In addition, in some cases, ICP-based localization may fail to localize due to a variety of factors, e.g., the environment lacking enough features (e.g., highways, tunnels, bridges), or if the LiDAR's view is blocked (e.g., by surrounding vehicles).

Cameras can be a very cost-effective type of sensor, and can already be found on or installed on many existing vehicles. Existing camera technology allows of capture of images that contain very rich information about the surrounding environment. As such, camera-based localization techniques may be used to replace or supplement ICP-based localization techniques.

In some embodiments, camera-based localization techniques utilize a map created via a map creation phase. Map creation may involve data from multiple different vehicles moving through different parts of the environment, and may be performed using a system that utilizes both image information (as captured via one or more cameras) and depth information (captured via LiDAR). The system extracts prominent edges from captured images, which are quantized into points called edgels. The 3D locations of the edgels (as well as additional information such as gradient information) are computed using the captured images and depth information, and saved as part of stored map (e.g., an OMap). In some embodiments, the map creation phase may be performed by an edgel creation system, such as the edgel creation module 460 of the HD map system 110 illustrated in FIG. 4. The resulting map may be stored in the HD map store 165. In some embodiments, the map creation phase may be referred to as an offline map creation phase, as the map can be constructed offline once the needed image information and depth information has been obtained.

Once a map indicating the 3D locations of edgels has been created, the map can be provided to one or more vehicles for performing localization. The subsequent localization can be performed with no dependency on LiDAR or other types of depth mapping sensors is needed. As such, camera-based localization can be utilized when LiDAR is malfunctioning or otherwise unavailable. During localization, a localization system (e.g., the localization API 250 of FIG. 2) loads edgels from the map located near an estimated location, detects edges from captures images (e.g., live camera feeds), and optimizes the pose of the vehicle by aligning the edgels with detected edges.

In some embodiments, camera-based localization processes may be able to achieve a high degree of accuracy (e.g., of the order of 10-20 cm), as long as cameras with sufficient resolution are used. In addition, in some embodiments, the localization process is not affected by passing vehicles, or shadows. The localization system is able to run high speed, for example, at a 30 HZ frequency side-by-side with other localizers. In addition, the localization system can be configured to run efficiently and not use up a large amount of computing resources. For example, in some embodiments, 6-8 cores and potentially some fraction of GPU capacity are sufficient for executing the processes disclosed herein.

Because the localization system does not depend on LiDAR during localization, camera-based localization can be performed when LiDAR is malfunctioning or not available, and does not leverage any information from LiDAR. As such, LiDAR may be leveraged only during map creation to determine 3D locations for detected edgels.

The localization system may be able to perform camera-based localization as long as the quality of the captured images is reasonable (e.g., as long as the scene is illuminated well enough for a sufficient amount of details, such as edges, can be determined from captured camera images). For example, in some embodiments, the localization system may assess an image quality of one or more captured images, and perform camera-based localization only if the quality of the captured images is determined to satisfy one or more criteria. In some embodiments, camera-based localization is performed following an initial determination of the vehicle's location, and is used to further refine the location and pose of the vehicle.

Map Creation Phase

During the map creation phase, image data from one or more cameras and depth data from LiDAR are used together to identify edgels within a local area, and to generate information for each edgel that is usable during the localization phase. In some embodiments, map creation can be performed by a plurality of vehicles moving through different areas of the local environment, each vehicle having one or more cameras for capturing image data, and a LiDAR system for capturing depth data.

Figure 9:
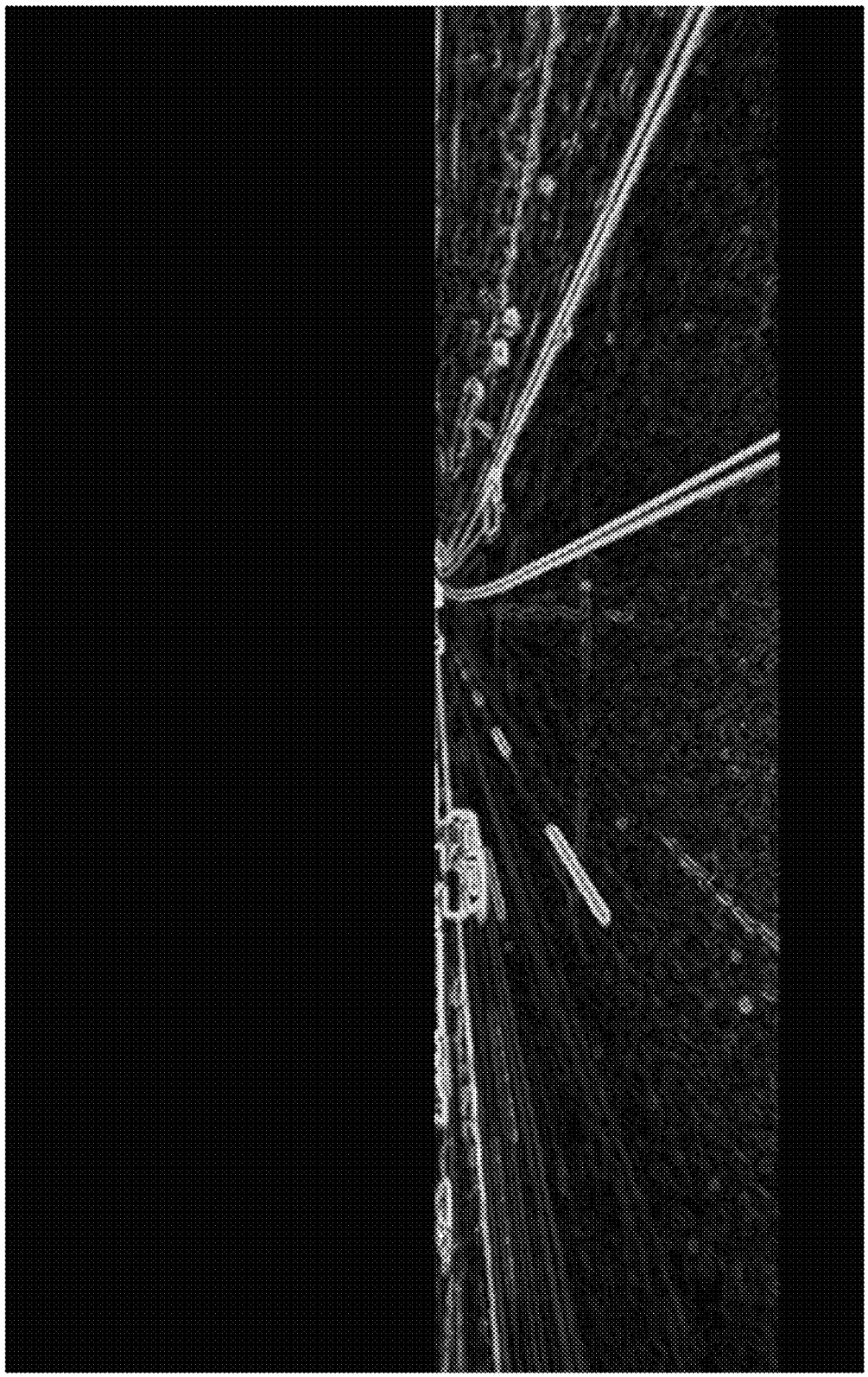
FIG. 9 shows an image illustrating result of computing intensity gradient according to an embodiment.

During the map creation phase, an edgel creation system (e.g., the edgel creation module 460 illustrated in FIG. 4) detects edge pixels in each of the captured images. An edge pixel may correspond to a pixel of a captured image that is along a detected edge within the image. The edgel creation system computes, for each of at least a portion of the detected edge pixels, a corresponding intensity gradient comprising a magnitude and an orientation. For example, the magnitude of the intensity may indicate a rate of intensity change of pixels across the detected edge, while the orientation indicates a direction of the intensity change (typically orthogonal to the detected edge). The intensity gradient may be represented as a vector having a length and direction based upon the magnitude and orientation of the intensity gradient, respectively. FIG. 9 illustrates an example of identified edge points of a captured image, in accordance with some embodiments. Each of the identified edge points in the image is associated with an intensity gradient represented as a vector oriented in a particular direction.

In some embodiments, the edgel creation system uses LiDAR scans to identify edgels and to compute a gradient vector for each edgel. For example, the edgel creation system projects ground points identified via each LiDAR scan onto accompanying camera images (e.g., camera images taken from the same location). In some embodiments, the edgel creation system performs ground enrichment for each LiDAR scan, such that the projected points include enriched ground points. Enriched ground points may correspond additional ground points added to the LiDAR scan based upon analysis of ground points obtained from the LiDAR scan (e.g., via interpolation). If a projected ground point does not land on an edge pixel of the camera image, the ground point is ignored. Otherwise, the ground point may be designated an edgel, and a gradient direction vector is computed for the ground point. By computing a gradient vector for each edgel, the localizer system can more easily match edgels with corresponding edge pixels of captured images during localization.

Figure 10:
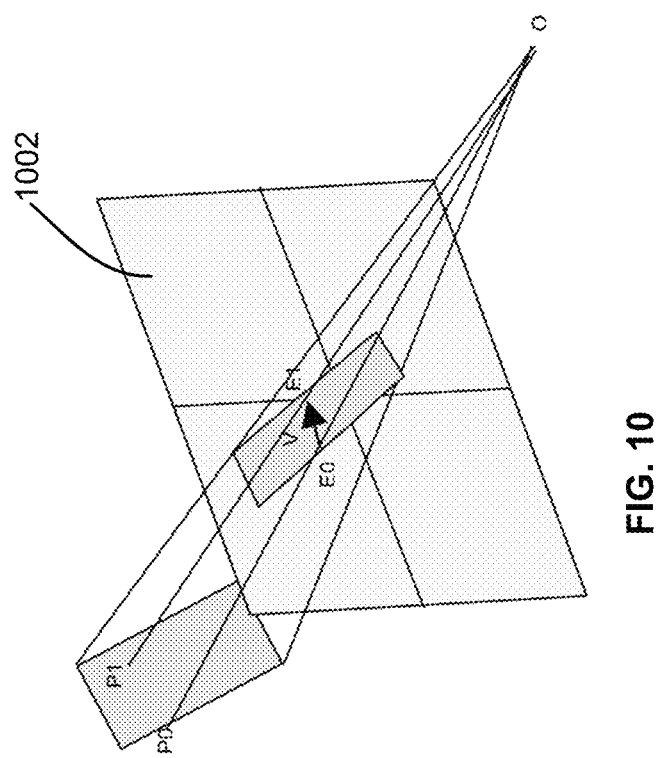
FIG. 10 illustrates computation of the gradient vector according to an embodiment.

FIG. 10 illustrates an example of computing a gradient vector for an edgel, in accordance with some embodiments. A gradient direction vector of an edgel may be computed based upon the gradient of the corresponding edge pixel of a captured image. For example, as illustrated in FIG. 10, the point $P_0$ corresponds to a 3D location (e.g., as determined using a LiDAR system). The image 1002 corresponds to an image concurrently captured by a camera (e.g., a live camera feed), wherein the camera center is located at the point O. When projected onto the image 1002, the projected point $P_0$ corresponds to the pixel $E_0$ of the image 1002. For example, the point $P_0$ can be projected onto the image 1002 by determining a ray $OP_0$ connecting the point $P_0$ and point O, and identifying the pixel $E_0$ at which the ray $OP_0$ intersects the plane of the image 1002. Thus, the point $P_0$ when projected on the image 1002 is considered to correspond to the pixel $E_0$. If the pixel $E_0$ is an edge pixel, the point $P_0$ can be designated as an edgel.

Figure 12:
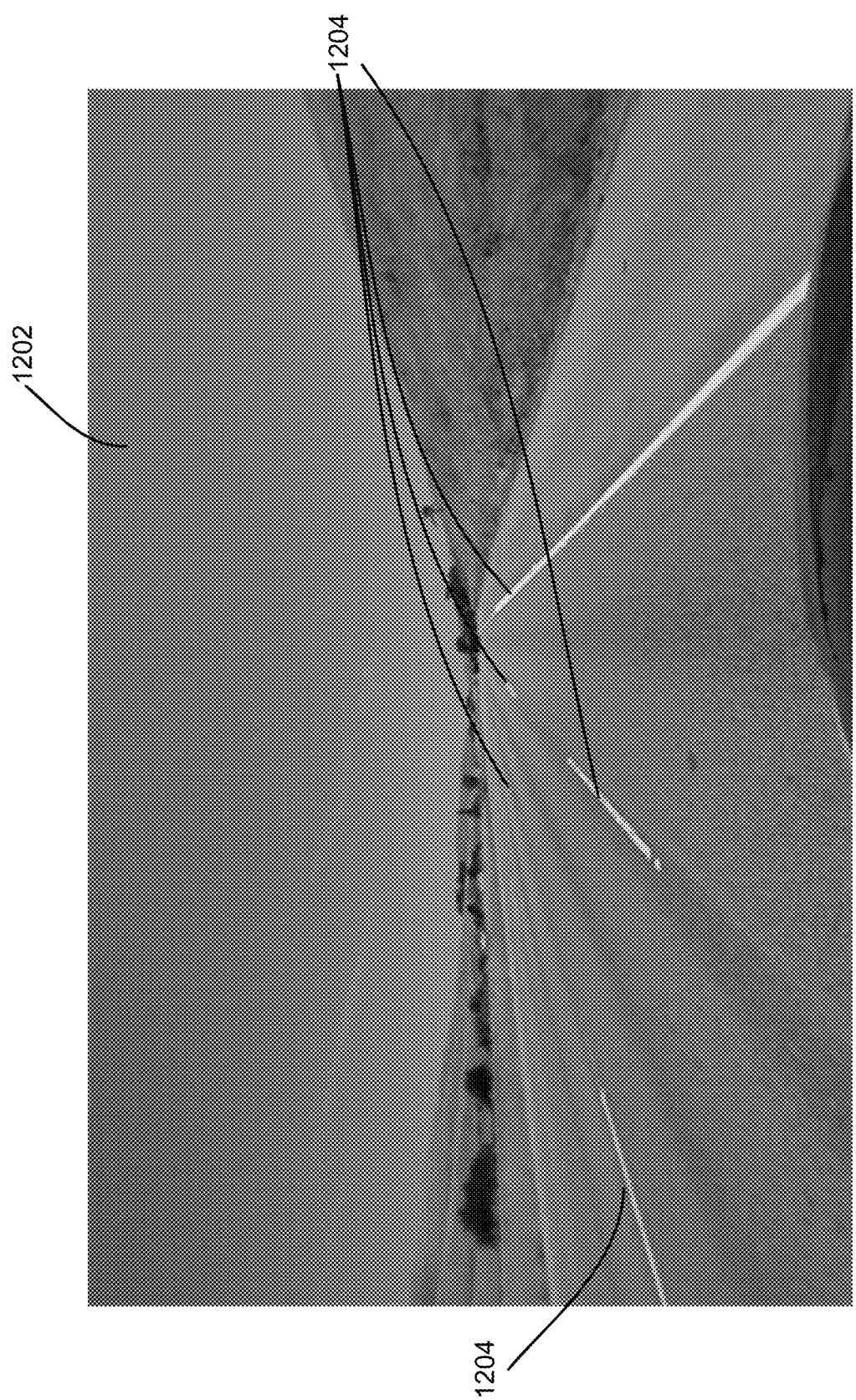
FIG. 12 shows an image illustrating edge clustering results according to an embodiment.

To determine an approximate gradient direction of the edgel $P_0$, the edgel creation system analyzes the image 1002 to determine a 2D gradient of the edge pixel $E_0$ on the image 1002. For example, as illustrated in FIG. 12, the gradient of the edge pixel $E_0$ corresponds to the vector V. The point $E_1$ corresponds to a 2D point on the image 1002 that is along the vector V a small distance away from $E_0$ (e.g., a predetermined distance, or based upon a magnitude of the intensity gradient of $E_0$).

The ray $OE_1$ corresponds to a ray connecting O and $E_1$. The edgel creation system extends the ray $OE_1$ to identify a 3D point $P_1$. In some embodiments, if the plane of the point $P_0$ is not known, the 3D point $P_1$ may be selected such that the distance $OP_1$ is the same as $OP_0$. Once $P_1$ is identified, the vector $P_0P_1$ can be used as an approximation of the 3D gradient direction for the edgel $P_0$.

In some embodiments, multiple cameras are used to capture images of the local area concurrently with the LiDAR scan, such that the point $P_0$ is able to be projected onto multiple different images. A point $P_1$ may be determined (e.g., as described above) for the point $P_0$ for each of the captured images, from which a respective vector $P_0P_1$ can be determined. The final gradient direction for the edgel $P_0$ may be determined as an aggregation (e.g., an average) of the determined $P_0P_1$ vectors.

In some embodiments, a plane that the edgel $P_0$ is on may be known or inferred. For example, in some cases the edgel creation system is able to determine a ground triangle on which the edgel $P_0$ belongs to (e.g., based upon one or more nearby LiDAR points), which can be used to determine a plane that the edgel $P_0$ is on. In such cases, the gradient direction for the edgel $P_0$ may be computed by finding the point $P_1$ corresponding to where the extension of the ray $OE_1$ intersects the plane that the edgel $P_0$ is determined to be on.

Not all edgels may be useful for localization, and in some cases, having too many edgels may make localization more difficult and increase processing burden and storage requirements. In some embodiments, the edgel creation system filters the identified set of edgels to eliminate non-useful edgels, while retaining edgels that are useful for localization. In some embodiments, detected edgels can be classified into three categories, described below.

A first category of edgels include edgels corresponding to features that are permanent and stationary. As used herein, a feature may be considered "permanent" if the feature is not expected to change in shape for at least a threshold amount of time. Permanent and stationary features under this category may include lane line markings and curb falls. Due to the permanent and stationary nature of these features, edgels corresponding to such features are typically suitable for performing localization.

A second category of edgels include those corresponding to features that are stationary but are expected to evolve or change over time. Such features may include tree or bush canopy, where the position of the feature may be subject to conditions such as wind or landscaping activities. As such, edgels corresponding to these features may be less reliable for use in localization.

A third category of edgels include edgels corresponding to transient features. These may include shadows, moving objects (e.g., other vehicles or pedestrians), debris on a road surface (e.g., tree leaves, garbage, etc.). Due to their transient nature, edgels corresponding to these features should not be used for localization.

To improve the robustness of localization, one or more filtering methods are used to reduce a number of edgels in the latter two categories while keeping edgels of the first category. Possible filtering methods may include LiDAR intensity based filtering, lane-line feature guided filtering, filtering based on time coverage, or some combination thereof.

In LiDAR intensity based filtering, an edgel is accepted and retained if LiDAR points around a small neighborhood of the edgel (e.g., LiDAR points within a threshold distance from the edgel) undergo significant intensity change relative to each other. Otherwise, the edgel may be discarded. LiDAR intensity based filtering will typically keep edgels corresponding to lane-line markings, since LiDAR points on lane-line markings typically carry higher intensity compared to those on the surrounding road surface. This type of filtering is often capable of filtering out most shadows, but may also filter out edgels corresponding to desirable features such as curbs, cracks, etc. that may not exhibit a large enough amount of intensity change. In some embodiments, this type of filtering may also fail to filter out transient objects, such as leaves, grass, and/or garbage present on a road surface.

In lane-line feature guided filtering, edgels that are very close to lane line features (e.g., within a threshold distance) are kept, while other edgels are discarded. The lane line features can be identified through deep learning, using an LMap (e.g., an LMap verified by one or more human operators), or some combination thereof. In some embodiments, due to this restrictiveness, this approach can eliminate almost all edgels associated with the second and third categories described above, but may also filters out curbs, other markings on the road surface (e.g., STOP, XING markings), and other features that may be desirable to use for localization.

Filtering based on time coverage involves capturing a mapping information for a location using multiple tracks at different types. If a location is covered by multiple tracks collected at different times, edgels corresponding to edges that appear in a consistent manner (e.g., consistent location and gradient direction) across multiple tracks are kept, while edgels that do not are discarded. Because this approach keeps edgels that are consistent across multiple points in time, this type of filtering can be used to filter out edgels associated with transient features such as shadows, and leaves and small trash that can be easily disturbed by moving vehicles.

Table 1 below shows a comparison between the different filtering approaches described above and the types of features that are likely to be kept or filtered out using each approach.

TABLE 1

| | LiDAR Intensity | Lane Line Feature-Guided | Time Coverage |
|---|---|---|---|
| Lane-line | Kept | Kept | Kept |
| Curbs | Removed | Removed | Kept |
| Other permanent markings | Kept | Removed | Kept |
| Tree/bush | Maybe kept | Removed | Kept |
| Shadow | Removed | Removed | Removed |
| Leaves/grass | Kept | Removed | Most removed |
| Trash | Maybe kept | Removed | Maybe kept |

While particular types of filtering approaches are described above, it is understood that in other embodiments, other types of filtering approaches, or a combination of filtering approaches may be used. In addition, edgels may be categories into different categories or additional categories from those described above.

As such, using the above techniques, a map comprising a plurality of edgels can be generated, where each edgel corresponds to a 3D location and is associated with a gradient direction. The resulting map can be distributed to a plurality of vehicles, allowing for each vehicle to perform camera-based localization to determine a location of the vehicle, even without the use of LiDAR or other types of depth sensing sensors.

Edge-Based Localization Using Camera Images

During localization, the localization system of the vehicle first obtains an initial estimate of a pose of the vehicle (also referred to as an "initial pose"). In some embodiments, the initial pose may be determined using a GPS navigation system, an IMU system, a previous pose determined using camera-based localization, an estimate produced by a Kalman filter based upon one or more previous estimates (e.g., previous GPS, IMU, and/or localizaton data), or some combination thereof. The initial pose may comprise a location and an orientation, and may be assumed to be accurate within a threshold distance (e.g., within 10 meters and within 10 degrees). Based upon the location of the initial pose, the localization system retrieves nearby edgels from a stored OMap (e.g., created during the map creation phase discussed above), and analyzes the edgels based upon captured camera images to localize the vehicle.

Figure 11:
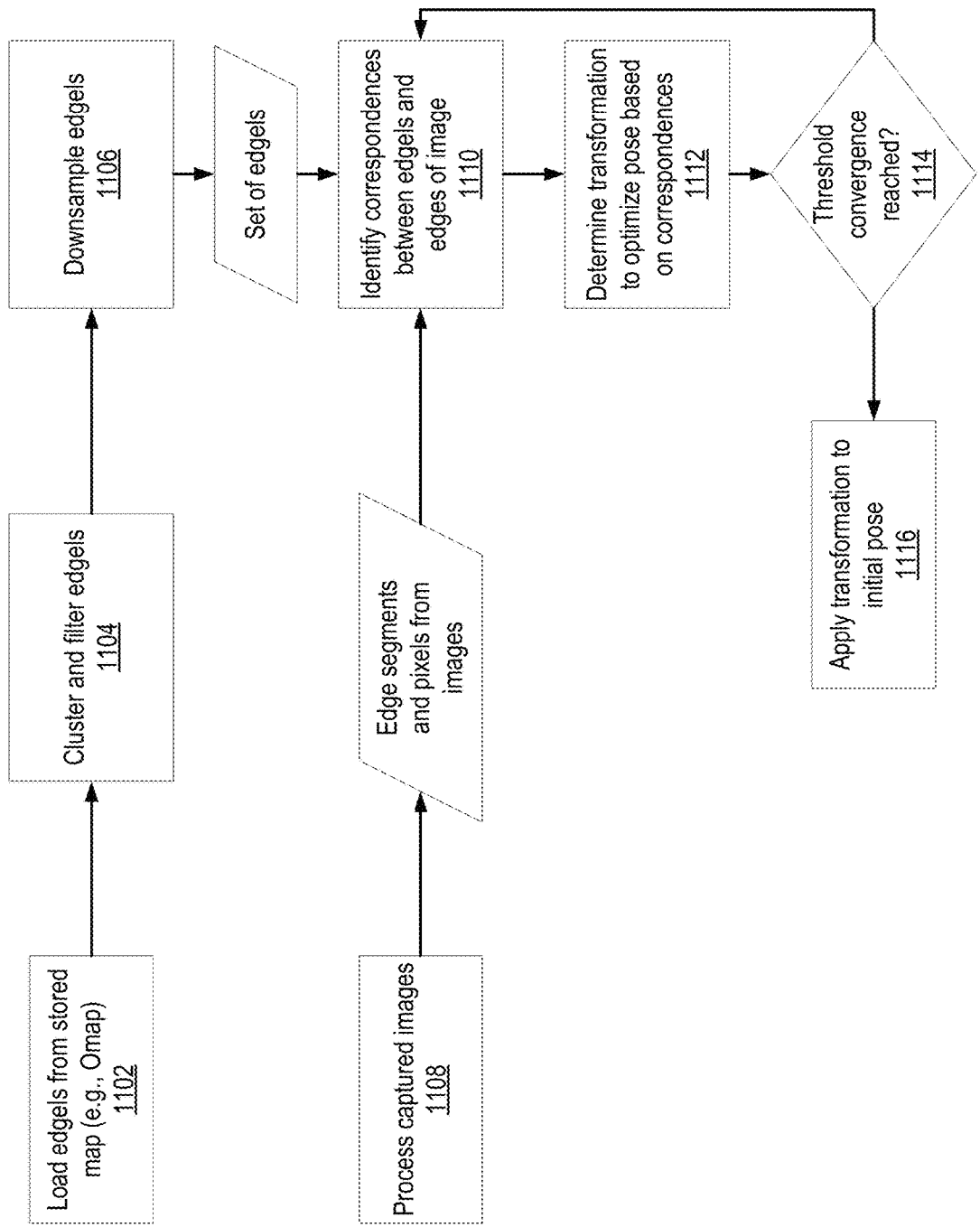
FIG. 11 shows the steps used by a localizer to optimize the pose according to an embodiment.

FIG. 11 is a diagram illustrating the steps used by a localization system to localize and optimize a pose of an vehicle, in accordance with some embodiments. Once an initial pose is determined, the localization system loads 1102 a plurality of edgels from a stored map (e.g., an OMap, such as that generated as part of the map creation phase as described above). In some embodiments, the plurality of edgels may correspond to edgels of the map that are within a certain radius around the location of the initial pose. In addition, the localization system uses one or more cameras of the vehicle to capture one or more images of the local area.

The localization system clusters and filters 1104 the plurality of loaded edgels. In some cases, not all loaded edgels will be useful for pose optimization. For example, edgels that are invisible to cameras are useless for localization. To identify useful edgels, the loaded edgels may be projected onto the captured camera images (e.g., based on the initial pose estimate). Edgels that are projected to be outside the view of the cameras may be discarded and are not utilized as part of the subsequent steps of the localization process.

The localization system may cluster the remaining edgels into one or more clusters, based upon distances between the 3D positions of the edgels. FIG. 12 shows an image illustrating edge clustering results according to an embodiment. As illustrated in FIG. 12, a set of edgels have been projected onto a captured image 1202. For ease of explanation, FIG. 12 illustrates that projected edges as being substantially aligned with the edges of features within the image 1202, although in some embodiments, the edgels projected onto the image 1202 may not align with the edges of the image, depending on a quality of the initial pose. Edgels within a certain distance from each other (as determined based upon their respective 3D location) are clustered together. For example, FIG. 12 shows edgels grouped into different clusters 1204, where each cluster may correspond to a portion a feature captured in the image 1202 (e.g., a portion of a lane line captured in the image). In some embodiments, the different clusters 1204 may be indicated on an interface using different colors. In some embodiments, edgels that are not part of a cluster or are part of the cluster containing less than a threshold number of edgels (e.g., orphan edgels) may be discarded.

In some embodiments, the localization system additionally downsamples 1106 the edgels of each of the edgel clusters. From a pose optimization point of view, a small number of edgels per cluster will generally provide sufficient constraints for performing localization, with additional edgels not adding significant additional value. For instance, of the edgels projected onto the edges of a lane line segment, edgels at the endpoints of the lane line segment may be sufficient for performing localization, since they provide constraints on both dimensions (e.g., x and y directions). On the other hand, edgels projected onto the side edges of the lane line segment may be less useful for localization. As such, downsampling performed on each cluster of edgels may be used to reduce a number of such edgels.

In some embodiments, edgels of a cluster are organized into buckets based on the orientation of their projected gradient vector. For example, edgels having projected gradient vectors with orientations within a certain range (e.g., a particular range of angles) may be grouped into the same bucket. Within each bucket, edgels that are closest to and furthest from the vehicle (based upon the initial pose) are automatically selected and kept. The remaining edgels of each bucket may then be sampled evenly based on their respective distances to the vehicle. In some cases, due to perspective projection, sampling the edgels based upon distance may lead to a denser amount of projected edgels on regions of the image corresponding to portions of the local area that are further away from the vehicle. According to another embodiment, the localization system performs sampling on the edgels of each bucket based on the projected positions of the edgel on image, to achieve a more even distribution of projected edgels on a captured image.

Figure 13:
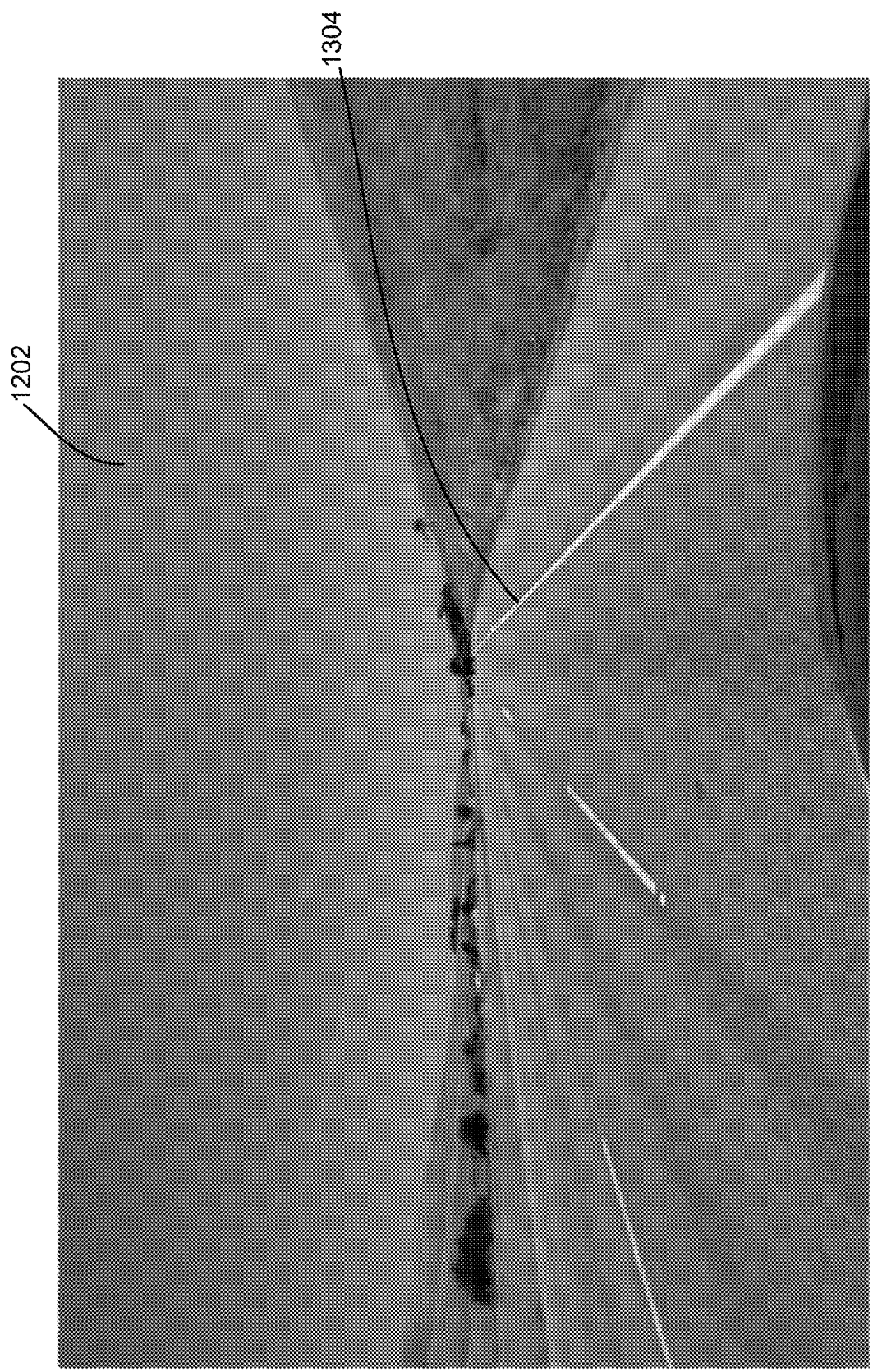
FIG. 13 shows an image illustrating effect of downsampling according to an embodiment.

FIG. 13 shows an image illustrating effect of downsampling according to an embodiment, in accordance with some embodiments. In comparison to the edgels projected onto the image 1202 as shown in FIG. 12, the edgels projected onto the image 1202 in FIG. 13 have been downsampled. As such, the number of edgels in each cluster 1304 may be reduced, where the retained edgels are selected based upon the directions of their respective gradient vectors and their distance from the vehicle (e.g., based on the initial pose).

In some embodiments, clustering, filtering, and downsampling of edgels may be performed when generating the OMap during the map creation phase. For example, as edgels are generated on the OMap, edgels within a threshold distance from each other may be automatically clustered on the map. In some embodiments, line geometry is computed for certain groups of edgels, such as line segments in 3D space connecting groups of edgels, as stored as part of the map. During localization, the predetermined clusters and/or line geometry associated with the edgels may be retrieved in addition to the edgels themselves. For example, the computed line geometry corresponding to multiple edgels can, during localization, be matched with corresponding edges from captured images.

The localization system processes 1108 the captured images to extract useful information, which will be used during pose optimization. In some embodiments, this image processing may be performed after or in parallel with clustering, filtering, and downsampling of the loaded edgels. In some embodiments, only a portion of each of the captured images is processed. For example, the edgels loaded from the stored map may only correspond to features that are on the ground. As such, only edges in the captured images that are on the ground are relevant for pose optimization, and only portions of the captured images corresponding to ground will need to be processed.

In some embodiments, the localization system detects edges within the processed portion of the images, and may compute line segments corresponding to the detected edges. In addition, the localization system computes an intensity gradient (which may include both magnitude and orientation) for pixels on the detected edges. In some embodiments, lane line detection (or other types of object detection) may be performed on the image to identify edges corresponding to lane lines (or other types of features).

Figure 14:
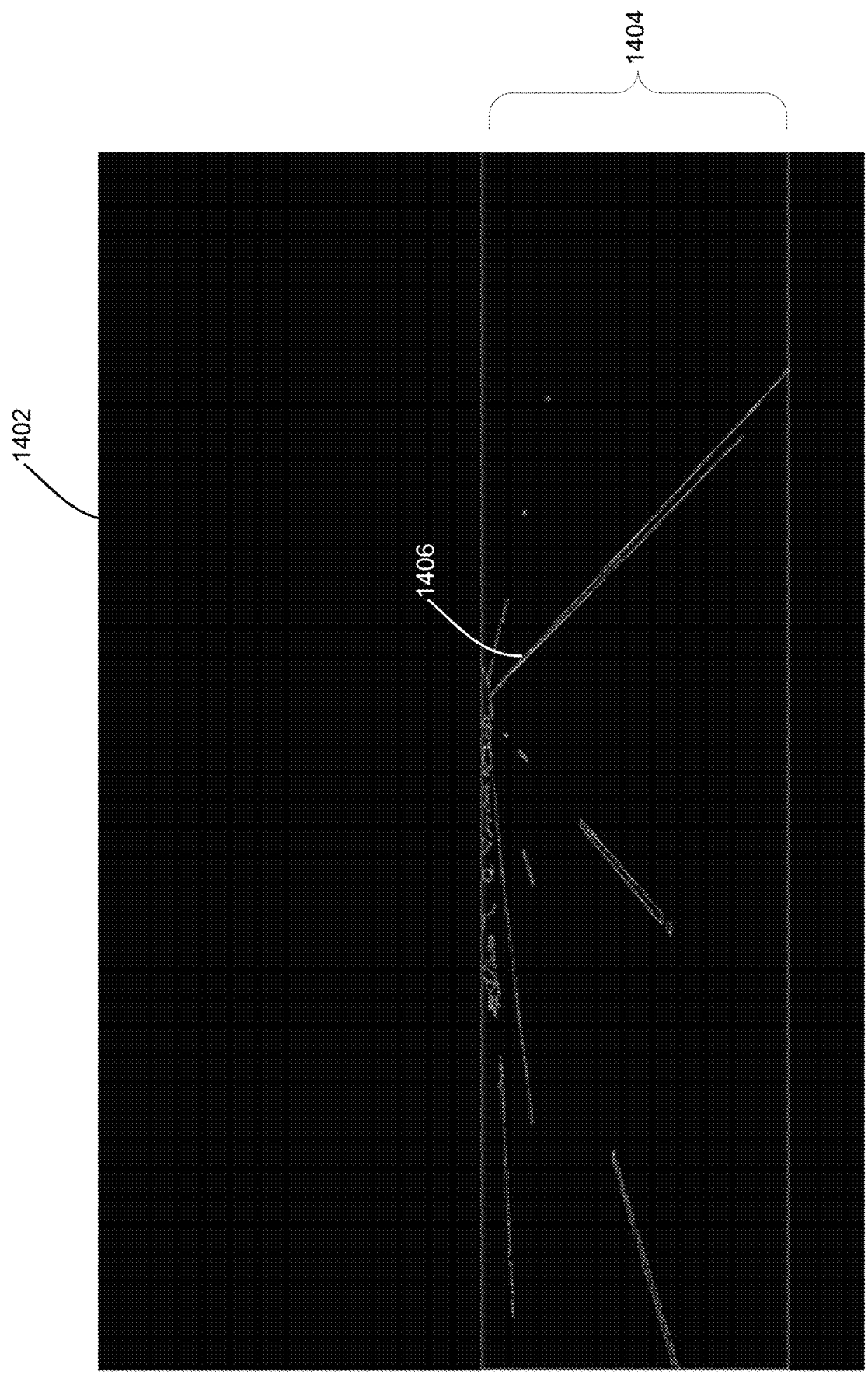
FIG. 14 shows an image illustrating effect of image processing to extract information useful for pose optimization according to an embodiment.

FIG. 14 shows an image illustrating the results of image processing to extract information useful for pose optimization, in accordance with some embodiments. The image 1402 illustrated in FIG. 14 may correspond to the image 1202 illustrated in FIG. 12, after a portion 1404 of the image 1202 has been processed. The portion 1404 may correspond to the portion of the image 1202 corresponding to ground. Within the portion 1402, edges 1406 have been identified, each having a plurality of edge pixels. Each edge pixel is associated with a gradient indicating an intensity and direction. Because portions of the image 1402 outside the portion 1404 may not be relevant for pose optimization, these remaining portions of the image may in some embodiments be discarded.

Once the captured images and loaded edges have been processed, the localization system identifies 1110 correspondences between the edge pixels of the captured images and the set of edgels (e.g., after clustering, filtering, and/or downsampling as described above). In some embodiments, the localization system finds correspondences by applying a current transform (initially an identity transform) to the set of edgels and their associated gradient vectors. The transformed set of edgels and their associated gradient vectors are projected onto processed camera images. For a particular edgel, the localization system attempts to determine a corresponding pixel for the edgel, where the corresponding pixel is defined to be the closest edge pixel of the captured image having an intensity gradient orientation with at least a threshold similarity to the orientation of the projected edgel's gradient vector (e.g., within 10). Once such a corresponding pixel is found for an edgel, the edgel's correspondence may be defined the line segment the pixel belongs to. On the other hand, if such a pixel does not exist (e.g., no edge pixel within a threshold distance of the projected edgel having an intensity gradient orientation similar enough to the projected gradient vector of the edgel), the edgel may be excluded during subsequent pose optimization.

In some embodiments, to improve the method's robustness in the presence of edges detected from undesirable features within the image, such as shadows and surrounding vehicles, one or more techniques for determining which edgel-edge pixel correspondences are useful for localization may be used. For example, in some embodiments, after correspondences are found for the edgels of an edgel cluster, a distribution for the gradient vector projection orientations of the edgels in the cluster is computed. Similarly, the localization system also computes a distribution for the intensity gradient orientation of corresponding pixels of the edgels of the cluster. If these two distributions are not similar (e.g., differ by more than a threshold amount), the edgel cluster may be ignored. For example, a vehicle shadow may be only partially visible in a captured image frame (e.g., only the right side of the shadow is visible). As such, the distribution of gradient directions of the edge pixels of the shadow may be skewed in comparison to the distribution of gradients of any edgels associated with the shadow.

In some embodiments, the localization system determines structure information for an edgel cluster (e.g., the distances between edgels in a cluster) and among different edgel clusters. For example, several of the edgel clusters may be aligned along a line, which may be a typical occurrence for certain types of features such as lane lines. The determined structure information may be used to help guide correspondence search. For instance, a lane line stripe is typically a skinny rectangle. A cluster of edgels may correspond with a lane line if the edgels of the cluster (e.g., a first edgel and a second edgel) correspond to edge pixels of a pair of line segments in the captured image, and the distance between the edgels corresponding to the different line segments is similar to the expected width of a rectangle corresponding to a lane line. By being able to infer what types of features certain clusters of edgels corresponds to, a determination can be made as to which clusters of edgels will more likely be useful for performing localization.

With a set of edgels and their correspondences, the localization system attempts to optimize 1112 of the vehicle based upon the determined correspondences. To do so, the localization system determines a transformation to transform the set of edgels so that they will most closely align with their corresponding edge pixels. For example, the localization system may attempt to find a transformation that minimizes an aggregate distance between the set of projected edgels on the image and their corresponding edge pixels. In some embodiments, the localization system attempts to find a transform to minimize the following energy function:

$$\Sigma\text{loss}(P2LS(e,l,T)) \qquad (1)$$

where $P2LS(e,l,T)$ is the distance from the projected position of an edgel e to its corresponding line segment l under the rigid 3D transform T, and loss( ) is a loss function configured to reduce an impact any outlier edgels.

Upon determination a transformation, the localization system determines 1114 if the transformed set of edgels and their corresponding edge pixels have reached a threshold level of convergence. Convergence may refer to a measure of how well the transformed edgels correspond with their corresponding edge pixels. In some embodiments, the convergence may be based upon a value of the energy function in Equation (1) described above.

If the threshold convergence has not been reached, the localization system may return to 1110, in which the localization system attempts to find correspondences between the transformed set of edgels and the edge pixels of the processed image. Because the edgels have been transformed (based upon the transformation determined during the previous pose optimization phase), each edgel may now correspond to a different edge pixel. In addition, as a result of the transformation, edgels for which corresponding edge pixels were not previously found may be able to be matched with corresponding edge pixels. The localization system may then attempt to perform pose optimization on the updated correspondences, until the threshold convergence is reached. In some embodiments, the localization system may perform pose optimization a threshold number of times, even if the threshold convergence is not reached.

If the threshold convergence is reached (or if pose optimization has been performed a threshold number of times), the localization system applies 1116 the determined transformation to determine a pose of the vehicle. For example, the determined transformation may be used to transform the pose of the initial pose (or a pose resulting from a previously applied transformation) to determine an updated actual position of the vehicle.

Figure 15:
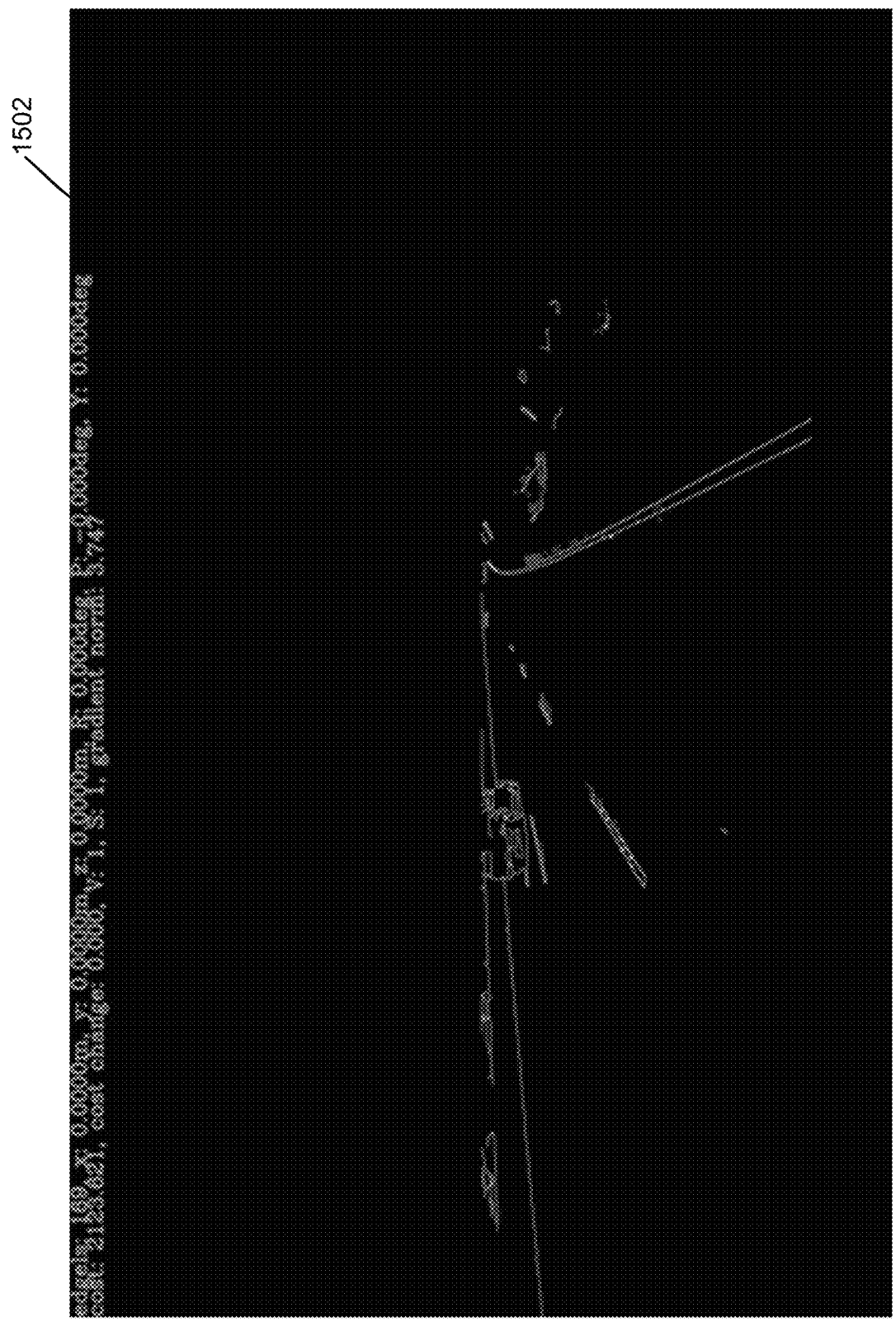
FIG. 15 shows an image illustrating alignment before pose estimation according to an embodiment.
Figure 16:
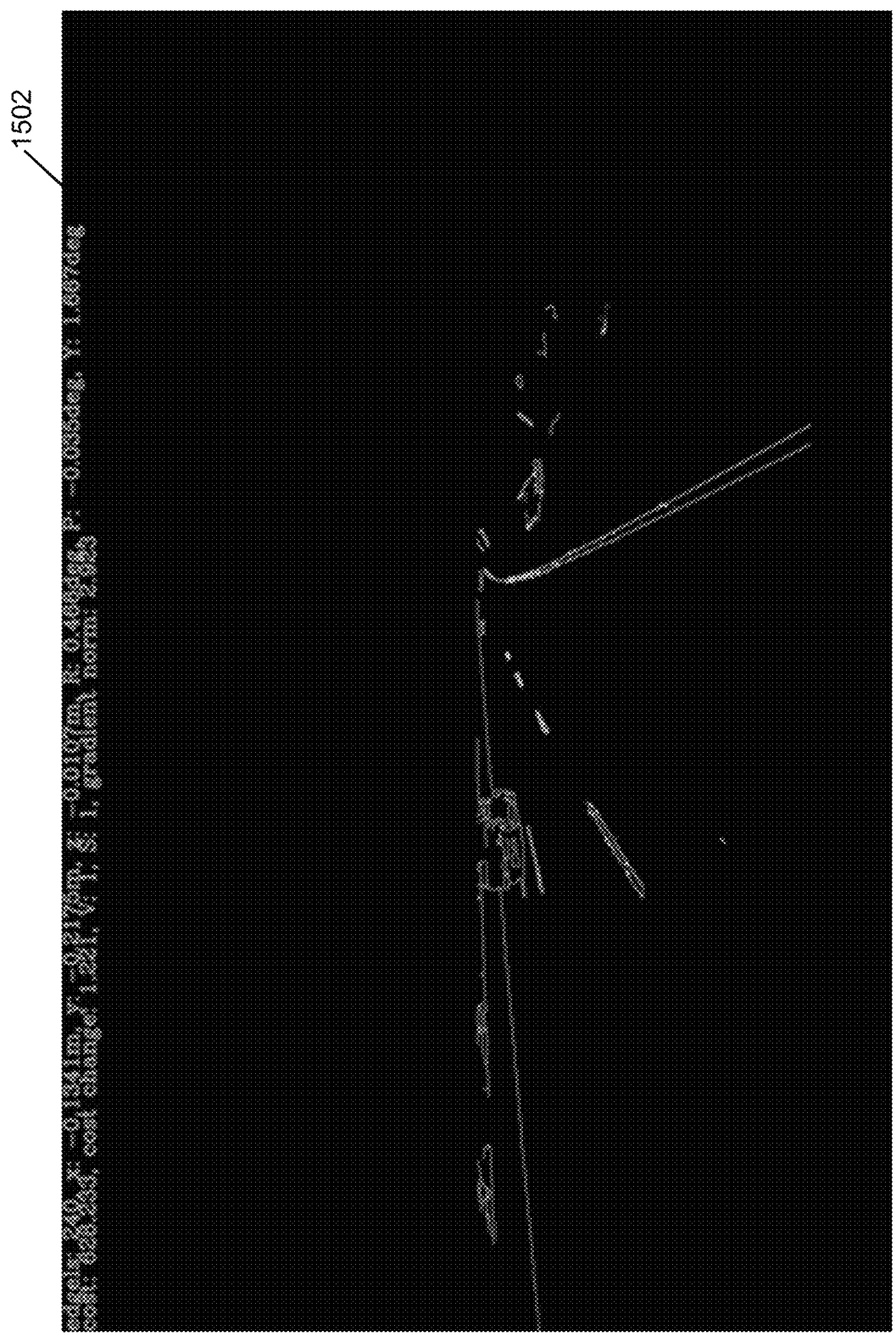
FIG. 16 shows an image illustrating alignment after pose estimation according to an embodiment.

FIG. 15 illustrates an image with projected edgels before pose estimation according to an embodiment. FIG. 16 illustrates the image with projected edgels after pose estimation according to an embodiment. For example, as illustrated in FIG. 15, a set of edgels (grouped into a plurality of clusters) is projected onto a processed image 1502. The edgels may have been projected based upon the initial pose. As such, while the edgels may be located in proximity to edge pixels of the processed image 1502, there is some degree of misalignment. For example, the edgels may include a first set of edgels that are over a threshold distance away from their determined corresponding edge pixels, and a second set of edgels that are within a threshold distance from their corresponding edge pixel.

FIG. 16 illustrates the image 1502 after pose estimation has been performed on the edgels. The edgels in FIG. 16 have been shifted based upon a transformation configured to reduce an aggregate distance between the edgels and their corresponding edge pixels. This may result in a larger number of edgels of the second set (e.g., edgels within a threshold distance from their corresponding edge pixel), indicating that the transformed edgels are more closely aligned with their corresponding edge pixels.

Alternate Embodiments

In some embodiments, due to the knowledge that the vehicle drives on the ground, the localization system may leverage the OMap to estimate a road surface normal that the vehicle is positioned on, and a height at which the camera images are captured. If the road surface normal and camera height are known, the z (corresponding to a vertical axis), roll, and pitch components of the transformation can be fixed, resulting in the localization system only needing to determine x, y, and yaw components for the transformation. This effectively reduces the search space for finding a transformation by restricting certain components of the transformation to fixed values. By reducing the search space for the transformation from 6 dimensions to 3 dimensions (due to z, roll, and pitch being fixed), a complexity and processing burden needed to perform pose optimization can be reduced. However, in cases where the road surface is not perfectly level, depending on the OMap to compute roll and pitch based upon a determined road surface normal may not be reliable, and may introduce error into the calculation.

Figure 17:
FIG. 17 shows an image provided as input for computing a distance transform, according to an embodiment.
Figure 18:
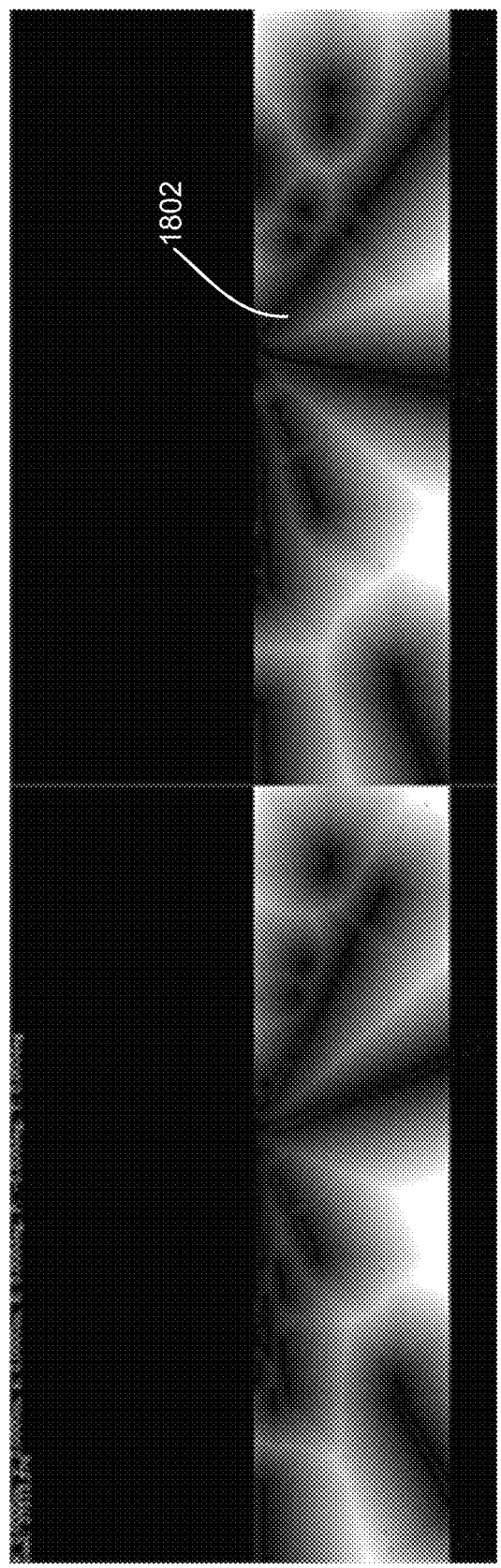
FIG. 18 shows the result of the distance transform on images captured using two different cameras, according to an embodiment.

In some embodiments, edgels are identified as stored as part of the OMap during map creation (e.g., as discussed above). However, the edgels may be stored without determining a corresponding edgel gradient vectors. Instead, during localization, the localization system identifies edges in captured images and generates an edge map. In some embodiments, the edge map corresponds to a binary image corresponding to at least a portion of a captured image, in which a value of 1 indicates the corresponding pixel of the captured image is on an identified edge, and a value of 0 indicates that the corresponding pixel is not on an identified edge. A distance transform is applied on the edge map. FIG. 17 shows an image provided as input for computing a distance transform, according to an embodiment. FIG. 18 shows the result of the distance transform on a binary image edge map derived from images captured using two different cameras (e.g., left and right cameras), according to an embodiment.

Edgels loaded from the OMap (e.g., based upon the initial pose) are projected on the generated distance transform of the binary image. For example, as illustrated in FIG. 18, the edgels 1802 are projected onto each of the distance transforms of the binary maps. The localization system optimizes the pose by determining a transformation that minimizes a value of the distance transform at the pixels corresponding to the projected edgel, where the values indicate, for each edgel, a distance of the pixel corresponding to the edgel to a nearest edge as indicated by the binary map. For example, the localization system may optimize the pose by minimizing the following cost function:

$$\Sigma\text{loss}(DT(P(e,T))) \qquad (2)$$

where $P(e,T)$ is the projected pixel location of an edgel e under pose T, and $DT(x)$ returns the value of a distance transform result at the specified pixel location, and loss( ) is a loss function to reduce the impact of certain outliers.

In some embodiments, by attempting to align the edgels with a distance transform of the captured images, a transformation for determining the pose of the vehicle can be computed using less processing resources (e.g., due to not needing to match gradients of individual edgels to determine correspondences). However, in some cases, because the cost function of the distance transform DT (x) may not be smooth, it may be possible for the transformed edgels to be trapped in local minima, leading to an inaccurate transformation.

As discussed above, embodiments of the invention perform camera based localization. Embodiments perform various steps/operations comprising computing gradient direction and associating the gradient direction with 3d point (e.g., an edgel), using the gradient direction associated with 3d point to find reliable correspondence to edge pixels of a captured image, filtering out edgels (e.g., to improve correspondence robustness), and optimizing a pose by using edgel point-to-line-segment distance. In other embodiments, the pose may be optimized based of a distance transform of one or more captured images.

Camera-Based Localization Process Flow

Figure 19:
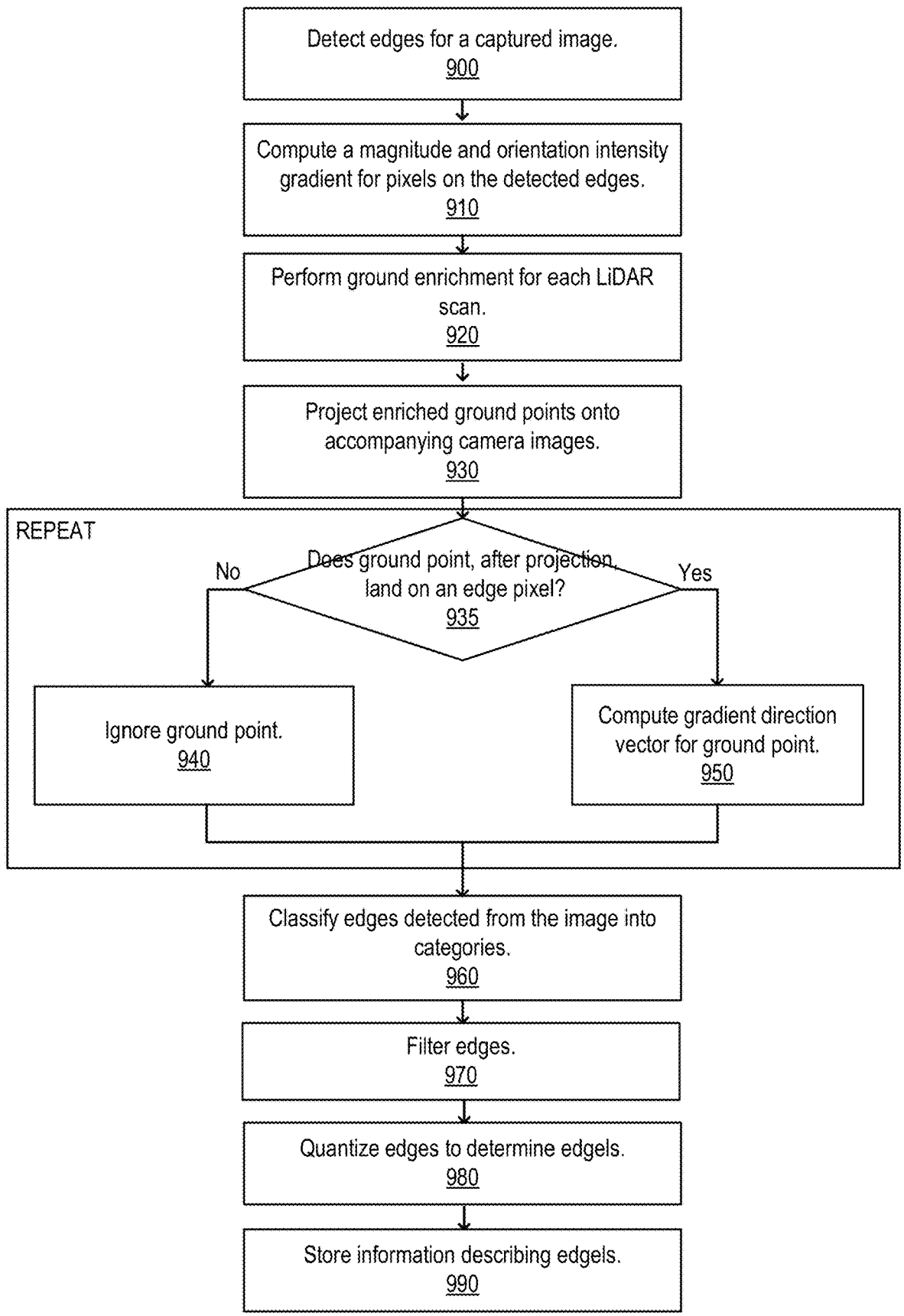
FIG. 19 shows a flowchart illustrating the overall process of building edgels according to an embodiment.

FIG. 19 shows a flowchart illustrating the overall process of building edgels according to an embodiment. The process of FIG. 19 may be performed by an edgel creation system during a map creation phase. For example, one or more vehicles within a local area may generate captured images and LiDAR scans of the local area, and use the generated image data and depth data to create edgels to be stored in a high-definition map.

The system detects 1900 edges for a captured image. For example, the system may identify an edge based upon changes in intensity of the pixels of the captured image. The system computes 1910 a magnitude and orientation intensity gradient for pixels on the detected edges. The magnitude may indicate a rate of intensity change across the edge, while the orientation may indicate a direction of largest intensity increase over the edge (typically orthogonal to the edge).

The system performs 1920 ground enrichment for each LiDAR scan. The system projects 1930 enriched ground points onto accompanying camera images. For each ground point, the system checks 1935 whether the ground point, after projection, lands on an edge pixel of the captured image. If the system determines that a ground point does not land on an edge pixel, the system ignores 1940 the ground point, or else the system computes 1950 gradient direction vector for ground point. The computed gradient direction vector may be based upon the intensity gradient of the corresponding edge pixel. In some embodiments, steps 1935, 1940, and 1950 may be repeated for each ground point of the LiDAR scan, in order to determine which of the ground points correspond to edge pixels.

In some embodiments, the system classifies 1960 edges detected from the image into categories. The system filters 1970 the edges. For example, the edges may be categorized based upon what types of features they correspond to, and are filtered based upon category of edge. In some embodiments, LiDAR intensity-based filtering, feature guided filtering, time coverage-based filtering, or some combination thereof may be used.

The system further quantizes 1980 the edges into points (called edgels) and saves 1990 information describing the edgel including the edgel's 3D location into OMap. As such, the resulting OMap may contain a plurality of edgels, each edgel corresponding to a 3D point and associated with a gradient direction vector. The OMap may be stored and used by vehicles for performing localization when traveling through the local area corresponding to the OMap.

Figure 20A:
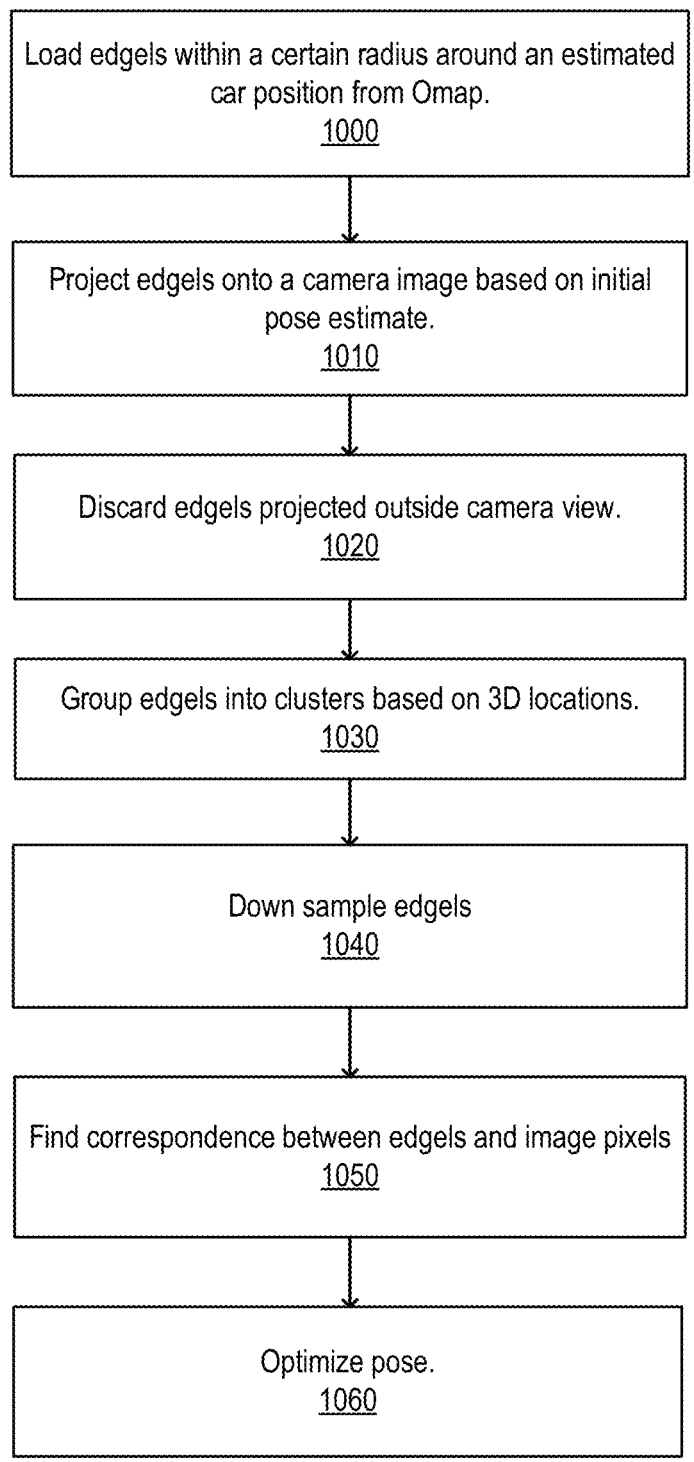
FIG. 20A shows a flowchart illustrating the overall process of performing localization based on edgels, according to an embodiment.

FIG. 20A shows a flowchart illustrating the overall process of performing localization based on edgels, according to an embodiment. The process of FIG. 20A may be performed by a localization system of a vehicle. The localization system may receive a previously created map (e.g., an OMap) that contains a plurality of edgels and an initial pose estimate.

The system loads 2000 edgels from the OMap that are within a certain radius around the position of the initial pose estimate. The system projects 2010 the loaded edgels onto a camera image based on the initial pose estimate. The system discards 2020 edgels projected outside camera view.

The system groups 2030 the edgels into clusters based on 3D locations. For example, edgels within a certain distance from each other may be organized into the same cluster. In some embodiments, the system down samples 2040 the projected edgels on the image. The system finds 2050 correspondence between edgels and image edge pixels. In some embodiments, a correspondence between an edgel and an edge pixel is established based upon a distance between the projected edgel on the image and the location of the edge pixel on the image, as well as the respective gradient directions of the edgel and edge pixel. The system optimizes 2060 a pose based on the correspondences. For example, the system may attempt to determine a transformation that minimizes a distance between the edgels and their corresponding edge pixels. In some embodiments, the system iteratively performs pose optimization until a threshold convergence between edgels and edge pixels is achieved. The resulting pose may be used to determine a current location of the vehicle.

Figure 20B:
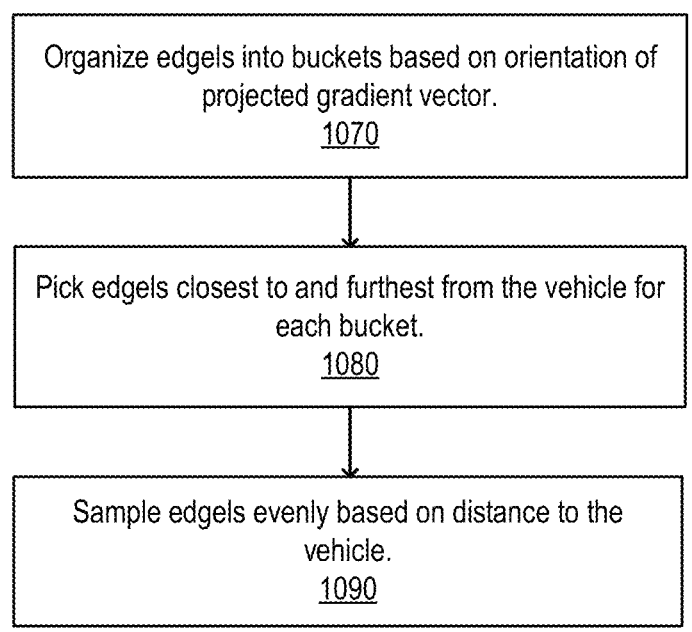
FIG. 20B shows a flowchart illustrating details of down sampling of images, according to an embodiment.

FIG. 20B shows a flowchart illustrating details of down sampling of images, according to an embodiment. As described above with relation to FIG. 20A, the system may downsample the loaded edges to reduce a number of edgels used during pose optimization. The downsampling may be based upon the edgel clusters and gradient directions of the edgels within each cluster, in order to ensure that certain types of edges in each cluster are retained for localization purposes.

The system organizes 2070 edgels into buckets based on orientation of projected gradient vector. The system picks 2080 edgels closest to and furthest from the vehicle for each bucket. In addition, the system samples 2090 a number of remaining edgels in each bucket evenly based on distance to the vehicle. As such, a number of edgels per cluster is reduced, while keeping an even distribution of edgels throughout the cluster as well as certain important edgels such as a closest and farther edgel for each bucket of the cluster.

Computing Machine Architecture

Figure 21:
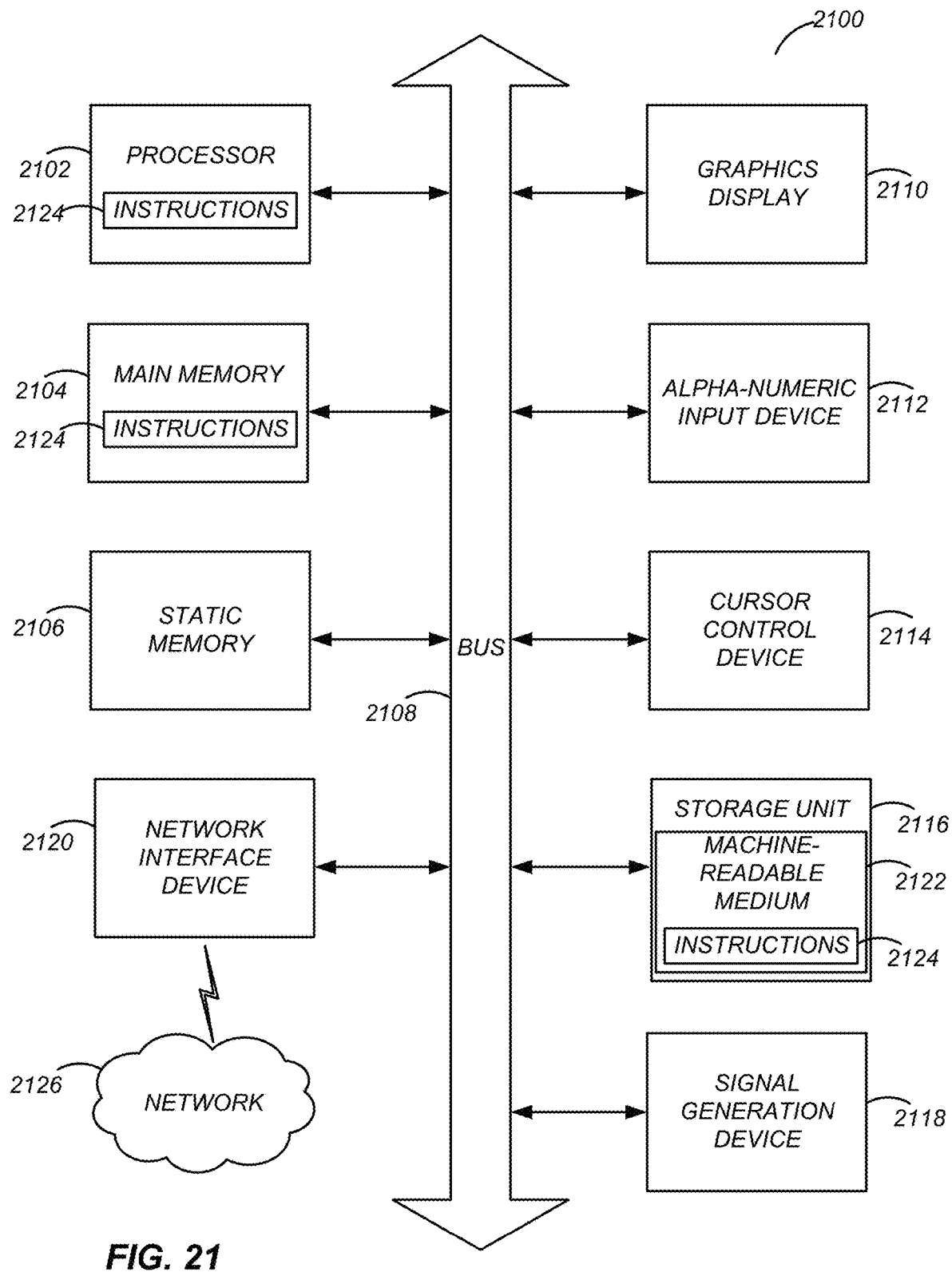
FIG. 21 illustrates an embodiment of a computing machine that can read instructions from a machine-readable medium and execute the instructions in a processor or controller.

FIG. 21 is a block diagram illustrating components of an example machine able to read instructions from a machine-readable medium and execute them in a processor (or controller). Specifically, FIG. 21 shows a diagrammatic representation of a machine in the example form of a computer system 2100 within which instructions 2124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2124 (sequential or otherwise) that specify actions to be taken by that machine. Further, while only a single machine is illustrated, the term "machine" shall also be taken to include any collection of machines that individually or jointly execute instructions 2124 to perform any one or more of the methodologies discussed herein.

The example computer system 2100 includes a processor 2102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2104, and a static memory 2106, which are configured to communicate with each other via a bus 2108. The computer system 2100 may further include graphics display unit 2110 (e.g., a plasma display panel (PDP), a liquid crystal display (LCD), a projector, or a cathode ray tube (CRT)). The computer system 2100 may also include alphanumeric input device 2112 (e.g., a keyboard), a cursor control device 2114 (e.g., a mouse, a trackball, a joystick, a motion sensor, or other pointing instrument), a storage unit 2116, a signal generation device 2118 (e.g., a speaker), and a network interface device 2120, which also are configured to communicate via the bus 2108.

The storage unit 2116 includes a machine-readable medium 2122 on which is stored instructions 2124 (e.g., software) embodying any one or more of the methodologies or functions described herein. The instructions 2124 (e.g., software) may also reside, completely or at least partially, within the main memory 2104 or within the processor 2102 (e.g., within a processor's cache memory) during execution thereof by the computer system 2100, the main memory 2104 and the processor 2102 also constituting machine-readable media. The instructions 2124 (e.g., software) may be transmitted or received over a network 2126 via the network interface device 2120.

While machine-readable medium 2122 is shown in an example embodiment to be a single medium, the term "machine-readable medium" should be taken to include a single medium or multiple media (e.g., a centralized or distributed database, or associated caches and servers) able to store instructions (e.g., instructions 2124). The term "machine-readable medium" shall also be taken to include any medium that is capable of storing instructions (e.g., instructions 2124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method, comprising:
   receiving, by an autonomous vehicle, from an imaging system mounted on the vehicle, an image frame, the image frame depicting a portion of a local area surrounding the vehicle;
   receiving an initial pose of the autonomous vehicle that is an estimate of an actual pose of the autonomous vehicle;

loading a plurality of edgels from map data of a High Definition (HD) map of the local area based upon the initial pose;

analyzing the image frame to identify a plurality of edge pixels within the image frame;

for each respective edgel of a subset of the plurality of edgels:
 projecting the respective edgel onto the image frame, based upon the initial pose; and
 determining a correspondence between the projected edgel and an edge pixel of the plurality of edge pixels, based upon a distance between the projected edgel and the edge pixel;

determining, based upon the determined correspondences, a transformation that if applied to the subset of edgels reduces an aggregate distance between the subset of edgels and their corresponding edge pixels;

applying the determined transformation to the initial pose to determine an updated pose of the autonomous vehicle with respect to the actual pose; and providing signals to the vehicle to navigate the autonomous vehicle based on the updated pose of the autonomous vehicle.

2. The method of claim 1, wherein determining the correspondence between the projected edgel and the edge pixel of the plurality of edge pixels is further based on a level of similarity between a gradient direction of the projected edgel and a gradient direction of the corresponding edge pixel.

3. The method of claim 1, wherein the plurality of edgels is associated with a map, the method further comprising:
 receiving, by the vehicle, the map indicating edgels within a local area.

4. The method of claim 3, wherein the plurality of edgels correspond to edgels indicated in the map having three-dimensional locations within a threshold radius of the location of the initial pose.

5. The method of claim 1, further comprising organizing the plurality of edgels into a plurality of clusters, each cluster corresponding to two or more edgels within a threshold distance of each other, based upon the respective three-dimensional locations of the two or more edgels.

6. The method of claim 5, further comprising determining the subset of edgels by downsampling the edgels of each of the plurality of clusters.

7. The method of claim 6, wherein downsampling the edgels of a first cluster of the plurality of clusters comprises:
 dividing the edgels of the first cluster into a plurality of buckets, based upon respective gradient directions of the edgels; and
 for each bucket of the plurality of buckets, retaining a first edgel of the bucket having a location closest to the location of the initial pose and a second edgel of the bucket having a location farthest from the location of the initial pose, and sampling the remaining edgels of the bucket based upon distance to the location of the initial pose.

8. The method of claim 5, further comprising, for a first cluster of the plurality of clusters:
 determining structural information of the first cluster, the structural information indicating at least a distance between a first edgel and a second edgels of the cluster; and
 based upon a determination that the first edgel and second edgel correspond to different edges within the image frame, inferring a type of feature associated with the cluster based upon the distance between the first and second edgels.

9. The method of claim 1, further comprising iteratively:
 applying the determined transformation to the subset of edgels;
 determining a level of convergence based upon the aggregate distance between the transformed subset of edgels and their corresponding edge pixels;
 in response to the level of convergence not satisfying a threshold value:
  updating the correspondences by determining a corresponding edge pixel for each of the transformed subset of edgels; and
  determining an updated transformation to minimize the aggregate distance between the subset of edgels and their corresponding edge pixels, based upon the updated correspondences.

10. The method of claim 1, wherein analyzing the image frame to identify a plurality of edge pixels within the image frame comprises:
 identifying a portion of the image frame corresponding to ground; and
 identifying the plurality of edge pixels within the identified portion.

11. The method of claim 1, further comprising:
 using the initial pose and a map of a local area to determine a ground normal vector;
 wherein determining the transformation comprises restricting one or more components of the determined transformation based upon the determined ground normal vector.

12. The method of claim 1, wherein generating the map data comprises:
 detecting one or more edges in a first image, each edge having one or more pixels each having a corresponding gradient;
 receiving a point corresponding to a three-dimensional location of the region, the point being obtained from a scan of the region;
 identifying a corresponding pixel of the first image by projecting the point onto the first image;
 in response to a determination that the corresponding pixel is a pixel on an edge of the one or more edges, designating the point as an edgel;
 determining a gradient direction corresponding to the edgel, based upon the gradient of the point; and
 storing information describing the edgel into the map.

13. A non-transitory computer readable storage medium storing computer program instructions, the computer program instructions when executed by a computer processor causes the processor to:
 receive from an imaging system mounted on an autonomous vehicle, an image frame, the image frame depicting a portion of a local area surrounding the vehicle;
 receive an initial pose of the autonomous vehicle that is an estimate of an actual pose of the autonomous vehicle;
 load a plurality of edgels from map data of a High Definition (HD) map of the local area based upon the initial pose;
 analyze the image frame to identify a plurality of edge pixels within the image frame;
 for each respective edgel of a subset of the plurality of edgels:
  project the respective edgel onto the image frame, based upon the initial pose; and determine a correspondence between the projected edgel and an edge pixel of the plurality of edge pixels, based upon a distance between the projected edgel and the edge pixel;

determine, based upon the determined correspondences, a transformation that if applied to the subset of edgels reduces an aggregate distance between the subset of edgels and their corresponding edge pixels;

apply the determined transformation to the initial pose to determine an updated pose of the autonomous vehicle with respect to the actual pose; and provide signals to the vehicle to navigate the autonomous vehicle based on the updated pose of the autonomous vehicle.

14. The non-transitory computer readable storage medium of claim 13, wherein determining the correspondence between the projected edgel and the edge pixel of the plurality of edge pixels is further based on a level of similarity between a gradient direction of the projected edgel and a gradient direction of the corresponding edge pixel.

15. The non-transitory computer readable storage medium of claim 13, wherein the plurality of edgels is associated with a map, and wherein the computer program instructions further cause the processor to receive the map indicating edgels within a local area.

16. The non-transitory computer readable storage medium of claim 15, wherein the plurality of edgels correspond to edgels indicated in the map having three-dimensional locations within a threshold radius of the location of the initial pose.

17. The non-transitory computer readable storage medium of claim 13, wherein the computer program instructions further cause the processor to:
organize the plurality of edgels into a plurality of clusters, each cluster corresponding to two or more edgels within a threshold distance of each other, based upon the respective three-dimensional locations of the two or more edgels.

18. The non-transitory computer readable storage medium of claim 17, wherein the computer program instructions further cause the processor to determine the subset of edgels by downsampling the edgels of each of the plurality of clusters.

19. The non-transitory computer readable storage medium of claim 18, wherein downsampling the edgels of a first cluster of the plurality of clusters comprises:
dividing the edgels of the first cluster into a plurality of buckets, based upon respective gradient directions of the edgels; and
for each bucket of the plurality of buckets, retaining a first edgel of the bucket having a location closest to the location of the initial pose and a second edgel of the bucket having a location farthest from the location of the initial pose, and sampling the remaining edgels of the bucket based upon distance to the location of the initial pose.

20. The non-transitory computer readable storage medium of claim 17, wherein the computer program instructions further cause the processor to, for a first cluster of the plurality of clusters:

determine structural information of the first cluster, the structural information indicating at least a distance between a first edgel and a second edgels of the cluster; and based upon a determination that the first edgel and second edgel correspond to different edges within the image frame, infer a type of feature associated with the cluster based upon the distance between the first and second edgels.

21. The non-transitory computer readable storage medium of claim 13, wherein the computer program instructions further cause the processor to, iteratively:
apply the determined transformation to the subset of edgels;
determine a level of convergence based upon the aggregate distance between the transformed subset of edgels and their corresponding edge pixels;
in response to the level of convergence not satisfying a threshold value:
update the correspondences by determining a corresponding edge pixel for each of the transformed subset of edgels; and
determine an updated transformation to minimize the aggregate distance between the subset of edgels and their corresponding edge pixels, based upon the updated correspondences.

22. The non-transitory computer readable storage medium of claim 13, wherein the computer program instructions further cause the processor to analyze the image frame to identify a plurality of edge pixels within the image frame by:
identifying a portion of the image frame corresponding to ground; and
identifying the plurality of edge pixels within the identified portion.

23. The non-transitory computer readable storage medium of claim 13, wherein the computer program instructions further cause the processor to:
use the initial pose and a map of a local area to determine a ground normal vector;
wherein determining the transformation comprises restricting one or more components of the determined transformation based upon the determined ground normal vector.

24. The non-transitory computer readable storage medium of claim 13, wherein generating the map data comprises:
detecting one or more edges in a first image, each edge having one or more pixels each having a corresponding gradient;
receiving a point corresponding to a three-dimensional location of the region, the point being obtained from a scan of the region;
identifying a corresponding pixel of the first image by projecting the point onto the first image;
in response to a determination that the corresponding pixel is a pixel on an edge of the one or more edges, designating the point as an edgel;
determining a gradient direction corresponding to the edgel, based upon the gradient of the point; and
storing information describing the edgel into the map.

* * * * *